(12) United States Patent
Aizikowitz et al.

(10) Patent No.: US 6,476,931 B1
(45) Date of Patent: Nov. 5, 2002

(54) SYSTEM AND METHOD FOR EFFICIENT PRINTING OF VARIABLE INFORMATION DOCUMENTS

(75) Inventors: Jacob Aizikowitz, Haifa; Israel Roth, Ra'anana, both of (IL); Evgeni Droi, Toronto (CA); Eli Bitan, Netanya (IL)

(73) Assignee: Creoscitex Corporation Ltd., Herzlia (IL)

( * ) Notice: Subject to any disclaimer, the term of this patent is extended or adjusted under 35 U.S.C. 154(b) by 0 days.

(21) Appl. No.: 09/348,056

(22) Filed: Jul. 6, 1999

(51) Int. Cl.[7] ............................................. G06K 15/00
(52) U.S. Cl. ..................................... 358/1.18; 358/1.17
(58) Field of Search ...................... 358/1.1, 1.14, 358/1.16, 1.17, 1.18, 1.13, 540, 404, 444, 296; 345/530, 536, 537, 538, 544, 545, 546

(56) References Cited

U.S. PATENT DOCUMENTS

| | | | |
|---|---|---|---|
| 4,928,252 A | 5/1990 | Gabbe et al. | |
| 5,025,397 A | 6/1991 | Suzuki | |
| 5,050,101 A | 9/1991 | Kiuchi et al. | |
| 5,500,928 A | 3/1996 | Cook et al. | |
| 5,594,860 A | 1/1997 | Gauthier | |
| 5,729,665 A | 3/1998 | Gauthier | |
| 5,740,338 A | 4/1998 | Gauthier et al. | |
| 5,760,914 A | 6/1998 | Gauthier et al. | |
| 5,793,946 A | 8/1998 | Gauthier et al. | |
| 5,796,930 A | 8/1998 | Gauthier et al. | |
| 5,905,506 A | 5/1999 | Hamburg | |
| 6,236,463 B1 * | 5/2001 | Cyman et al. | 358/1.17 |
| 6,359,700 B1 * | 3/2002 | Briggs | 358/1.18 |

FOREIGN PATENT DOCUMENTS

| | | |
|---|---|---|
| EP | 0 703 524 B1 | 1/1997 |
| EP | 0 821 319 A2 | 1/1998 |
| WO | WO 99/24933 | 5/1999 |

\* cited by examiner

Primary Examiner—Arthur G. Evans
(74) Attorney, Agent, or Firm—Eitan, Pearl, Latzer & Cohen-Zekek

(57) ABSTRACT

A method of generating a printer-ready representation of a page from a collection page elements and a first set of page assembly instructions, when a portion of the page assembly instructions refer to the page elements, includes the steps of comparing the first set with at least one previously stored set of page assembly instructions, assembling the collection and the first set in accordance with the result of the step of comparing, thereby generating the printer-ready representation of the page, and storing the first set and the printer-ready representation.

60 Claims, 12 Drawing Sheets

SYSTEM AND METHOD FOR EFFICIENT PRINTING OF VARIABLE INFORMATION DOCUMENTS

FIELD OF THE INVENTION

The present invention relates to digital printing, in general, and to the use of digital printing technology for printing variable information (or personalized) documents, in particular.

BACKGROUND OF THE INVENTION

The following is a list of commonly used terms in the art, as well as some new definitions:

Booklet—A set of pages that are part of the print job and need to be collated into one document. A booklet represents an instance of the document that was personalized for a specific recipient or group of recipients.

Flat—A film or plate or a sheet of paper that contains the images of several pages, typically organized as 2, 4, 8, 16, or even 32 pages per flat. The specific arrangement of the pages on the flat is typically derived from needs of further binding, and it is the result of an imposition processing.

Cache—Typically used for describing small but very fast memory that is expected to store data of items (typically memory cells) that with high probability will be needed frequently. Because the Cache is much faster than the regular memory used for storing the items, performance of programs is significantly enhanced if they find the items they need in the Cache. Since the size of the Cache is small, it is always important to have a policy that replaces old items in the Cache with new items; the goal of such a policy is to improve the chances of finding the needed items in the Cache. In this specification and claims, the term "Cache Management" is used to name this policy. Several algorithms for Cache Management are known in the art. In the context of the present invention the term "Cache" means storage for some representation of items— elements, parts of pages, or full pages—that serve the Page Assembly Process. It is assumed that using an item from a Cache is faster than reprocessing the item.

Raster—A data format where a graphic entity is divided into a rectangular grid of small units of area called pixels and where for each pixel a color value is stored. An image line or scan line is one row of pixels.

Printer-Ready (PR)—A representation of a page or page element in a format that is suitable for delivery by a print subsystem to some print-engine. This may be, in many cases, a raster format. In some implementations, partially processed, non-raster, representations are possible as well.

Page Description Language (PDL)—A language that serves to describe what image the printer should generate on a page.

Raster Image Processor (RIP)—A hardware or software or combined hardware and software means to translate (transform) pages specified in a PDL into a printer-ready representation.

Region—A region is defined relative to the printer-ready representation and it can be any rectangular area of the full page that can be addressed, retrieved, and replaced without processing the rest of the full page. A full page is obviously a region, and so is a segment which contains an integer number of full image lines. A tile, which is a rectangular area that contains an integer number of partial image lines of the same length, can also be a region.

Reference is now made to FIG. 1, which is a schematic block diagram illustration of a prior art digital printing system. The system comprises a Raster Image Processor (RIP) 10 connected to a printing subsystem 12 via a printer-ready (PR) storage subsystem 14. The printing subsystem 12 comprises a printer interface 16 connected to a printer 18. The major functionality of such systems is for the RIP 10 to process a specification of pages into a printer-ready representation of these pages, and to deliver the printer-ready representation of the pages to the printer interface 16 that drives the printer 18.

Page specifications are given in a page description language (PDL), non-limiting examples of which are Postscript and Portable Document Format (PDF), both from Adobe Systems Incorporated of California, USA and Printer Control Language (PCL) from Hewlett Packard of California, USA. Several applications used to create documents are known in the art, for example, but not limited to PageMaker and FrameMaker from Adobe Systems Incorporated of California, USA, Word from Microsoft Corporation of Washington, USA, and QuarkXPress from Quark, Inc. of Colorado, USA. Such applications respond to a user's request for printing by generating specifications of the pages to be printed using a PDL. The imaging system uses the RIP 10 to translate these specifications into a printer-ready format suitable for the printer 18.

In traditional printing applications, such as those using offset printing, the specifications typically define a single page, or a group of pages known as a flat. The system images these pages onto a film that is later used to make a plate (modern systems support the capability to image directly onto the plate). In digital printing, it is also possible to specify a set of pages to be printed in sequence, in order to generate a collated document (also known as "electronic collation").

In traditional printing, the process of generating films or plates is decoupled from the printing process. Therefore, printing does not impose any real-time constraint on the RIP process. In contrast, there is a real motivation for achieving real-time translation in digital printing. If the translation from specification to printer-ready representation could be done at a rate similar to the rate at which the printer emits printed pages, then the size of the intermediate storage required as a buffer between the RIP 10 and the printing subsystem 12 could be reduced. This is especially significant for the case of collated documents, where the intermediate storage may need to store all the pages of the collated document (which can be a few hundreds pages long) prior to starting the actual printing.

In general, however, real-time translation is not achievable, due to the rich semantics of PDLs such as PostScript. It is known in the art that if the PDL is a full scale programming language (for example, PostScript), then real-time translation cannot be guaranteed without limiting the acceptable input or the semantics of the PDL. Therefore most digital printing systems have two-phase, sequential processing between the RIP 10 and the printing subsystem 12. In the first phase, the RIP 10 translates the PDL into printer-ready representations and in the second phase, the printer interface 16 reads these printer-ready representations and drives the printer 18 to generate pages.

When dealing with the printing of variable information documents, the approaches described hereinabove become unusable as the number of different booklets increases. Variable information documents may be addressed to very large populations, as large as ten thousand and more. Therefore, printing systems must support huge (and impractical) intermediate storage between the translation and printing phases for storing the printer-ready representations of all the pages.

In order to avoid the need for an impractical large intermediate storage, the system must be capable of processing these pages—from specification to printer-ready—at the real-time rate dictated by the printer 18. This fundamentally requires the limitation of the PDL semantics. In other words, if, for example, a specific subset of a PDL is used for specifying pages then it might be possible to guarantee a real-time constraint for the processing of these pages.

Various digital printing systems are described in the European Patent Application EP 0703524 B1 assigned to AGFA, the U.S. Pat. Nos. 5,740,338, 5,760,914, 5,739,946, and 5,796,930 to Gauthier et al., the U.S. Pat. Nos. 5,729,665 and 5,594,860 to Gauthier, and the U.S. Pat. No. 5,500,928 to Cook et al.

The Xcikon Variable Data System for the Xeikon DCP series of digital color presses from Xeikon nv of Belgium, is a printing system that can process printing jobs at the rate of the print engine, provided that the page specifications are severely restricted.

SUMMARY OF THE INVENTION

There is provided in accordance with a preferred embodiment of the present invention a method for generating printer-ready representations of pages having regions described by page assembly instructions. The page assembly instructions of each region of a current page are compared with the page assembly instructions of each equivalent region of a previous page. The previous page has a printer-ready representation. The printer-ready representation of the current page is generated by reusing a portion of the printer-ready representation of the previous page, the portion corresponding to each region of the previous page that is similar to the equivalent region of the current page, and assembling each region of the current page that is not similar to the equivalent region of the previous page. There is also provided in accordance with a preferred embodiment of the present invention a method for generating printer-ready representations of pages having regions described by page assembly instructions, the printer-ready representations and the page assembly instructions are separable into multiple layers. The method includes the step of selecting at least one of the multiple layers. For each selected layer, the page assembly instructions of each region of a current page are compared with the page assembly instructions of each equivalent region of a previous page having a printer-ready representation. The selected layer of the printer-ready representation of the current page is generated by reusing a portion of the selected layer of the printer-ready representation of the previous page, the portion corresponding to each region of the previous page that is similar to the equivalent region of the current page, and assembling each region of the current page that is not similar to the equivalent region of the previous page. There is also provided in accordance with a preferred embodiment of the present invention a system for generating printer-ready representations of pages.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention is directed to systems and methods that enable the printing system to significantly increase the chances of meeting the real-time constraints while processing the input stream.

According to a preferred embodiment of the present invention, pages are specified in terms of pre-defined graphical building blocks—called elements. In the description and claims of the present invention which follow, the term "page" is used both to describe a single page and to describe a flat of pages. These elements are not restricted in the position they occupy in the page's plane, nor must they adhere to any design constraints (e.g., no overlap between elements etc.). Page description languages (PDLs) that explicitly describe pages in terms of some unique data for the specific page and an assembly of pre-defined elements are commercially available. Examples include the Variable Printing Specification (VPS) Language from Scitex Corporation of Herzliya, Isreal and PostScript Level 2 from Adobe Systems Incorporated of California, USA.

A trivial way for generating printer-ready pages of a variable information print job that is specified as a collection of pages made out of elements, is to reprocess all the participating elements while creating the printer-ready representation of each page. Although the appearance of the generated pages will be correct, this method will generally not meet the speed demanded by the print engine. Since in practice it is common to have print jobs where quite a few of the elements are shared by some or all of the pages, it is desirable to modify the trivial method above in a way that will allow efficient re-use of previously processed elements.

In accordance to a preferred embodiment of the present invention, the page description language (PDL) used for specifying the variable information print jobs explicitly states which elements will be re-used and which will be used only once. It is thus possible to process the re-usable elements once, save their printer-ready representation in disk or memory storage and repeatedly use these "cached" representations of pre-processed elements when constructing pages. The present invention is directed to a system and method for efficient rasterization (we use the term rasterization in a more general sense—the generation of the printer-ready representation from the specification), caching and composition of variable information pages out of page elements.

Figure 1:
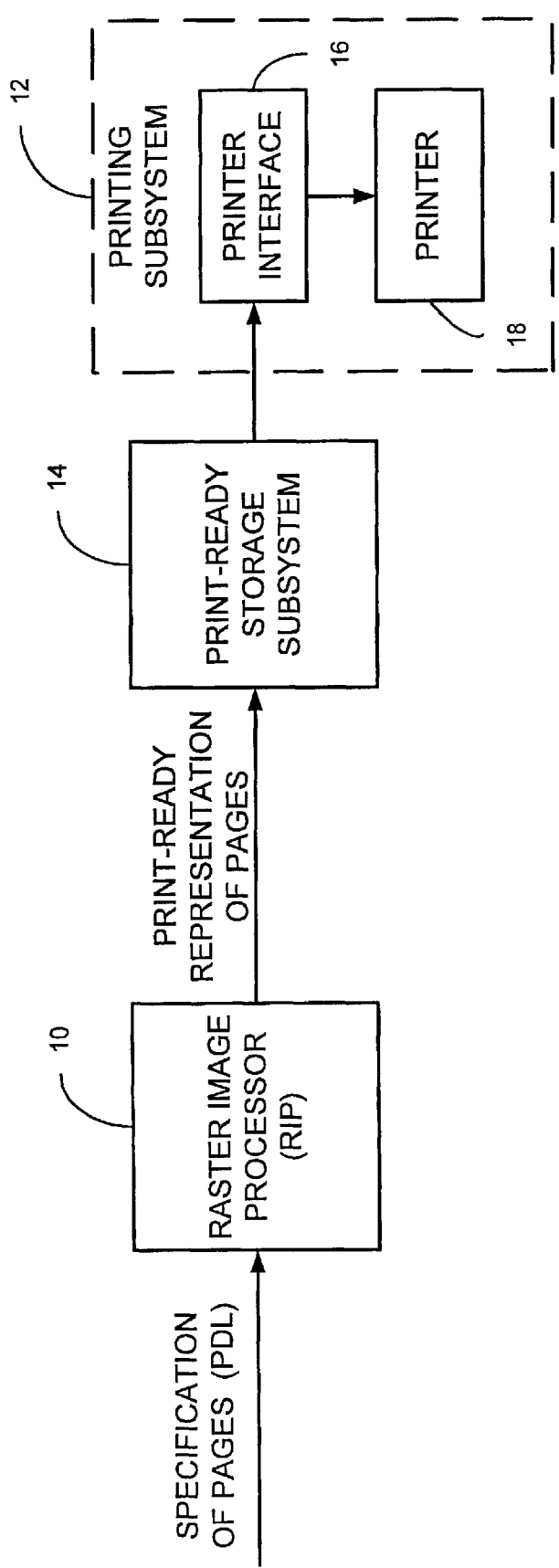
FIG. 1 is a schematic block diagram illustration of a prior art digital printing system.
Figure 2:
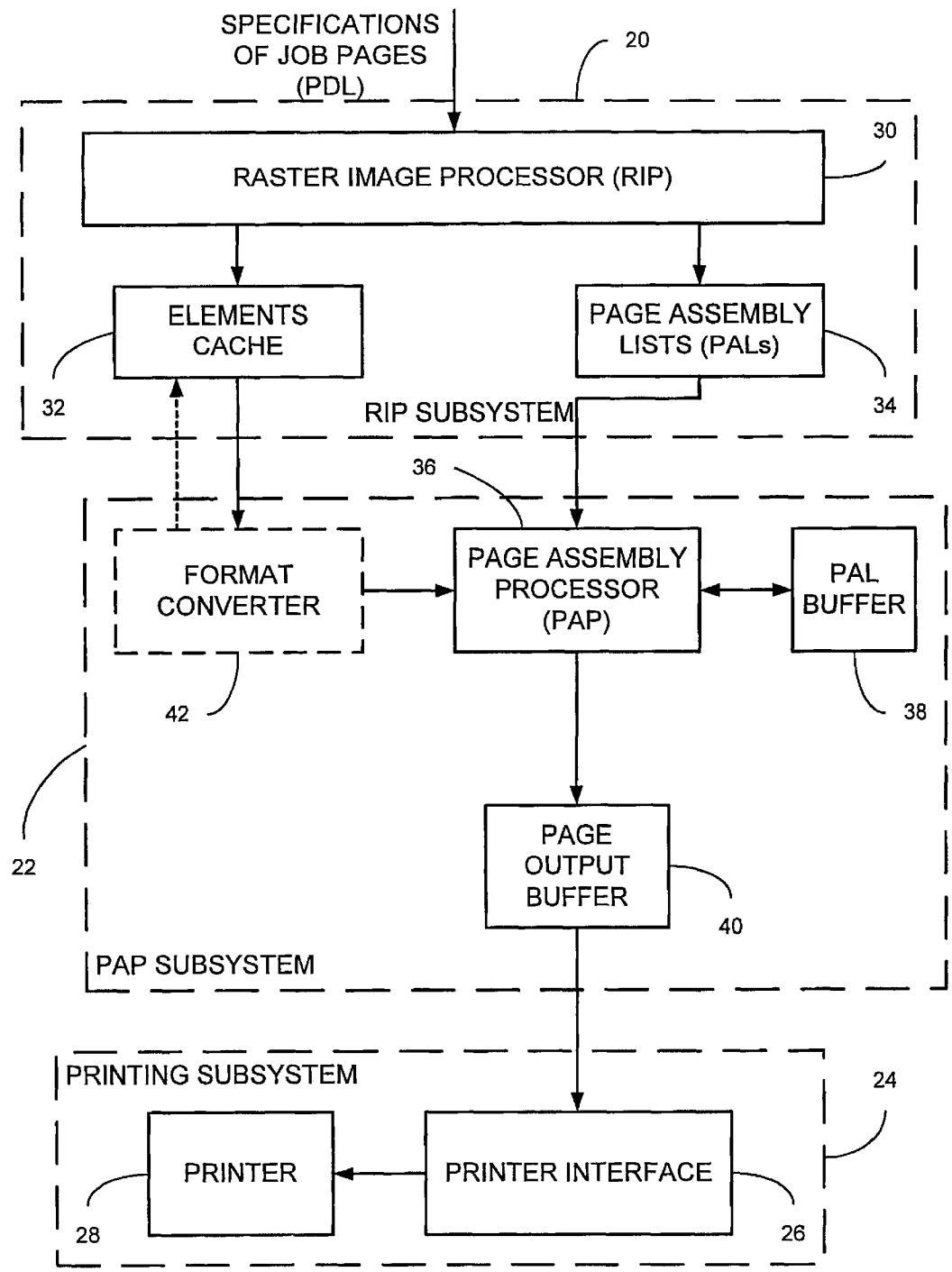
FIG. 2 is a schematic block diagram illustration of a digital printing system having a single online buffer, according to a preferred embodiment of the present invention.

Reference is now made to FIG. 2, which is a schematic block diagram illustration of a digital printing system having a single online buffer, in accordance with a preferred embodiment of the present invention. The system comprises a Raster Image Processor (RIP) subsystem 20, a Page Assembly Processor (PAP) subsystem 22, and a printing subsystem 24. The printing subsystem 24 comprises a printer interface 26 connected to a printer 28. It will be appreciated by those skilled in the art that the present invention is applicable to any suitable imaging subsystem capable of receiving as input the equivalent of printer-ready representation of pages. Examples for such imaging subsystems include, but are not limited to, image setters, digital printers, and display systems. The present invention is described herein with respect to digital printers only for the purpose of clarity.

The RIP subsystem 20 receives a file or stream comprising specifications of pages belonging to a print job. The print jobs are specified by descriptions of elements and descriptions of pages, the page descriptions having references to the elements that were previously described in the context of the print job. The specifications may be described using any PDL that allows explicit description of pages in terms of elements, or in certain specific cases may be extracted automatically from a PDL that does not allow explicit description of pages in terms of elements.

The RIP subsystem 20 comprises a RIP 30 connected to an elements cache 32 and to a collection 34 of Page Assembly Lists (PALs). The RIP 30 processes the incoming PDL stream (or file) of a given job and generates, for each page of the job, a set of page assembly instructions. The RIP 30 also generates printer-ready representations of the elements and stores them in the elements cache 32.

According to a preferred embodiment of the present invention, the page assembly instructions are represented as a Page Assembly List (PAL). A PAL is a list of <loc, element_ref> pairs, where loc is a coordinate in the plane of the page, and element_ref is a reference to an element (e.g., the name of a file, or a pointer to some memory area). The semantics of the PAL is that the referenced elements will be placed onto the page canvas, starting from an empty canvas and adding to its top (i.e., Z-axis) as you go down the list. All the generated PALs for the job are stored in a Job Description File (JDF) which, in addition to the PALs, has also an index that provides direct access to each PAL.

It will be appreciated by those skilled in the art that the set of <loc, element_ref> page assembly instructions generated by the RIP 30 need not be arranged in a LIST (PAL) as long as the order of the elements in the Z-axis is clear, nor need the PALs be stored together in a JDF, rather the scope of the present invention includes any arrangement of the set of page assembly instructions.

The elements cache 32 can be either real memory of disk storage or any other suitable storage area. The elements in the cache 32 are stored there either as the result of processing the current job or as a result of processing another job that is "related" to the current job. In VPS terminology, "related" means the same job-context. Other languages might have another formal construct to express "related" print jobs.

The PAP system 22 comprises a PAP 36 connected to a PAL buffer 38 and to a page output buffer 40. The PAP subsystem 22 optionally also comprises a format converter 42 connected to the PAP 36. The PAP 36 processes the JDF and generates, for each page, its printer-ready representation from its PAL. The PAP 36 assembles the elements referenced by the page's PAL according to the order and location given by the PAL. The elements are taken from the elements cache 32. If the elements in the elements cache 32 are not in the appropriate printer-ready format, for example, because they are compressed, then the format converter 42 converts the elements to printer-ready format before the PAP 36 processes them. The format converter 42 may also store the converted element, which is now in printer-ready format, in the elements cache 32, as indicated by the dotted arrow. The resulting printer-ready page is written into the page output buffer 40. Processing of the PAL for the next page depends on its availability (i.e., synchronization with the RIP subsystem 20) and on the availability of space in the page output buffer 40 (i.e., synchronization with the printing subsystem 24).

The printing subsystem 24 comprises a printer interface 26 connected to a printer 28. The printer interface 26 handles the required data processing, data transfer, and control of the printer 28. The output buffer 40 is connected online to the printer interface 26, which reads, possibly region by region, the printer-ready representation of the page (once such representation is ready) that is the output buffer 40 and drives the printer 28 to generate the corresponding printed page.

It is known in the art that the simplest way to assemble pages from elements is to follow the PAL semantics operationally. That is, for each page, generate its printer-ready representation into the output buffer 40 by:

1. clearing the buffer,
2. sequentially processing the PAL and for each pair writing into the output buffer 40, at the memory address that corresponds to the pair's "loc", the data referred to by the pair's "element_ref".

The major drawback of this simple prior art method is its potentially slow performance, which arises because it does not take into account the high-probability for similarity between the pages to be printed. Since pages belonging to the same document have a high likelihood for similarity, not only elements can be re-used but also fully assembled regions of the pages.

The present invention is directed to a system and method for efficiently overcoming this major performance drawback by using data from previously assembled pages in order to minimize the assembly time of the current page.

Optimizing Page Assembly

When preparing to assemble a new page, the Page Assembly Processor (PAP) 36 determines the "similarity" between regions of the page to be assembled and corresponding regions of the most recently assembled page (currently stored in the output buffer 40). Certain implementations may put restrictions on the printer-ready representation that will render certain types of regions irrelevant (because they can no be efficiently addressed, retrieved, or modified). For example, in certain implementations segments are regions whereas tiles are not.

According to a preferred embodiment of the present invention, the PAP 36 determines the "similarity" of the page to be assembled with the page in the output buffer 40 by using the PALs of the two pages for comparing regions of the new page to regions of the page in the output buffer 40. The PAL of the page in the output buffer 40 was previously stored in the PAL buffer 38. The PAP 36 reuses the printer-ready representation of regions that were found to be identical, and assembles from scratch the printer-ready representation of regions that were found to be different. The result is that the output buffer 40 now contains the printer-ready representation of the most recently assembled page. The PAL of that page is stored in the PAL buffer 38. Since only those regions of the pages which differ from the regions of the most recently assembled page are assembled, the digital printing system of FIG. 2 has a better chance of being capable of generating printer-ready representations of pages at the rate of the printing subsystem 24.

Figure 3A:
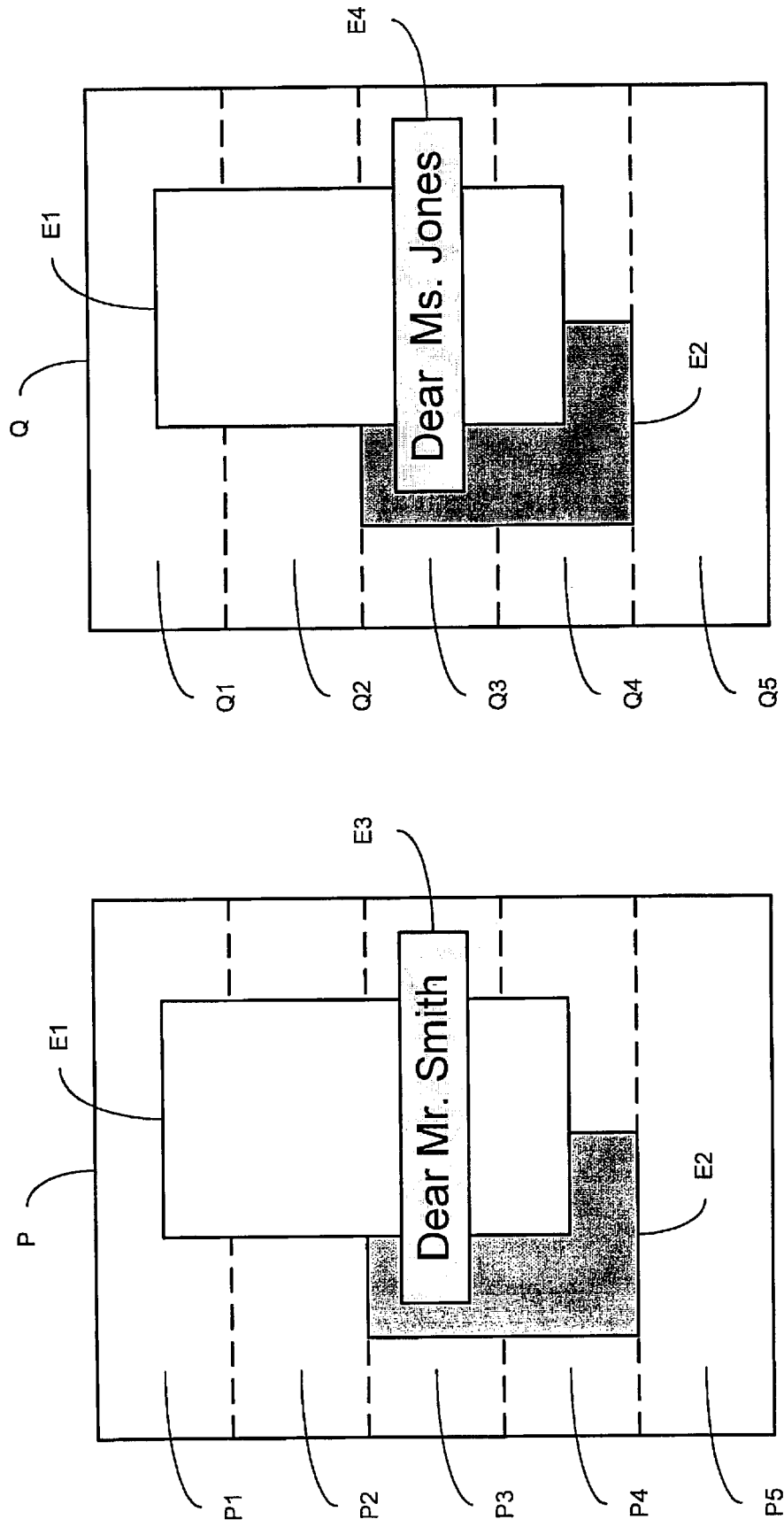
FIGS. 3A and 3C are schematic illustrations of pages divided into regions, according to two preferred embodiments of the present invention.

Reference is now made additionally to FIG. 3A, which is a schematic illustration of two pages, P and Q, divided into regions, in accordance with a preferred embodiment of the present invention. P is the page to be assembled and Q is the page whose assembled printer-ready representation is in the output buffer 40. The page P is divided into five regions, P1–P5, and the page Q is divided in five corresponding regions, Q1–Q5. The division of the pages into five regions only is shown for clarity; it will be appreciated that the division into regions will be determined by the properties of the PAP subsystem or the printing subsystem.

The page P is described by PAL(P), which is provided to the PAP 36 by the RIP subsystem 20, and the page Q is described by PAL(Q), which is stored in the PAL buffer 38. The PAL for page P, PAL(P), refers to the elements E1, E2 and E3, whereas the PAL for page Q, PAL(Q), refers to the elements E1, E2 and E4. Each with its corresponding coordinates in the plane of the page. It is possible to extract a PAL for each region, for example, a PAL(P1) for the region P1 of the page P. For each region, the PAP 36 compares the PAL for the region of the page P with the corresponding PAL for the same region of the page Q. If the PAL for P defines an identical region to the one defined by the PAL for Q, then the PAP 36 does not assemble the region for P. If the PAL for P defines a region that differs from the one defined by the PAL for Q, then the PAP 36 assembles the region for P from the elements in the elements cache 32.

It will be appreciated that in the particular case of full-page regions, the PAP 36 reuses the printer-ready assembly of page Q. In the output buffer 40 when PAL(P) and PAL(Q) define an identical printer-ready representation for every pixel on the page. When the PAL(P) and PAL(Q) define different pages, the whole page P is assembled.

Comparing PALs

Methods for comparing PALs will now be described. If the elements that are referred to in a PAL are not overlapping, then any permutation of the <loc, element_ref> pairs will describe the same region. Therefore, it is possible to define a normal form for a PAL of non-overlapping elements, where the <loc, element_ref> pairs appear in stored order, say first by the Y coordinate and then by the X coordinate. It is then straightforward to compare two PALs of non-overlapping elements—simply lexically compare the PALs in their normal form.

When elements are overlapping in the region, then the order in which they appear in the PAL is significant. Thus the sorting method described above needs to be enhanced so that the Z-axis coordinate will be taken into account. Furthermore, elements that are completely covered (these elements are in the PAL, but are covered by other elements and therefore their image is not displayed) do not affect the question or whether the regions defined are identical. In order to account for overlapping and non-overlapping elements, the normalization method should consist of two steps: a) an enhanced sorting method (described hereinbelow) that takes into account the Z-axis effects, and b) removing of hidden elements.

The enhanced sorting method for normalization comprises the following steps:

a) every pair <loc, element_ref> in the PAL is marked with a Z-axis value; and b) the pairs are sorted first by Z-axis value, then by Y-axis value, and then by X-axis value (or equivalently, first by Z-axis value, then by X-axis value, and then by Y-axis value).

The Z-axis values assigned above begin with a value of 0. For every element referenced in the PAL the process checks if there is an already traversed element that is covered—even partially—by the currently examined element. If there is such a covered element then the mark of the current element is set to the mark of the covered element plus 1, unless the mark of the current element is already higher.

The normalized PALs can now be compared lexically to determine whether they define the same printer-ready region.

Figure 3B:
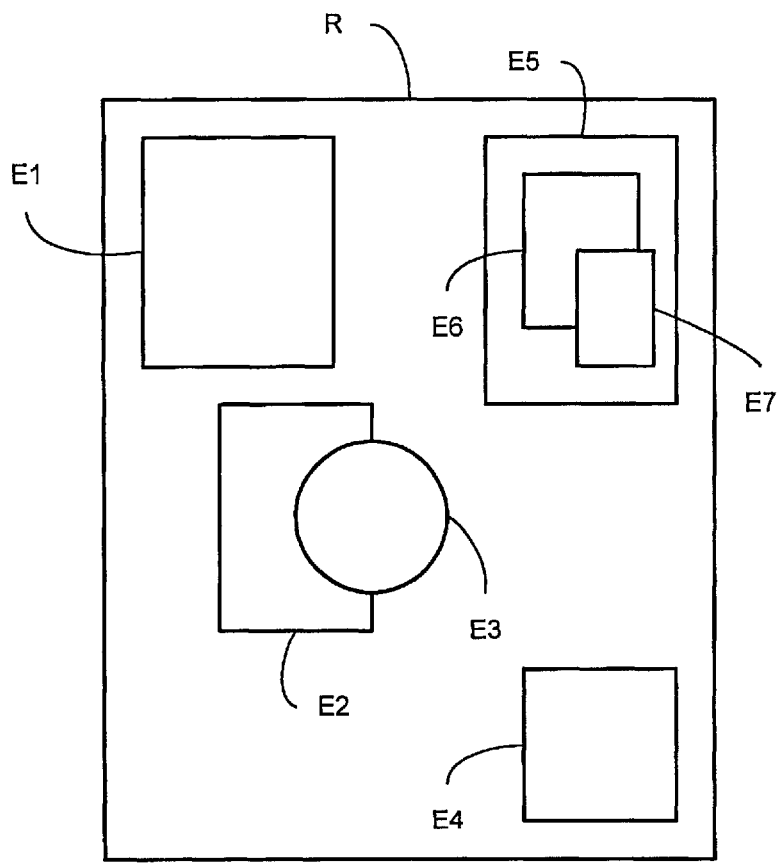
FIG. 3B is a schematic illustration of an example page and example page assembly lists (PALs), according to a preferred embodiment of the present invention.

FIG. 3B, to which reference is now made, is a schematic illustration of an example page and example page assembly lists (PALs), in accordance with a preferred embodiment of the present invention. FIG. 3B shows an example of the PAL normalization method. A region R is composed of several elements E1–E7. PAL1 is the original PAL of the region R, PAL2 is a permutation of the lines of the PAL1, and PALN is the normalized PAL of region R. PAL1, PAL2, and PALN all describe the same region R.

It will be appreciated that the PAL normalization method can be carried out by the PAP 36, or alternatively can be part of the RIP subsystem 20. In the latter case, either the RIP 30 produces normalized PALs, or the PALs produced by the RIP 30 are later normalized within the RIP subsystem 20. It will also be appreciated that not employing normalization may affect performance but not correctness. Furthermore, certain cases where two PALs may define identical regions but their normal forms as defined here will be different exist. Again, these cases will only degrade performance but not create incorrect printer-ready regions.

Figure 3C:
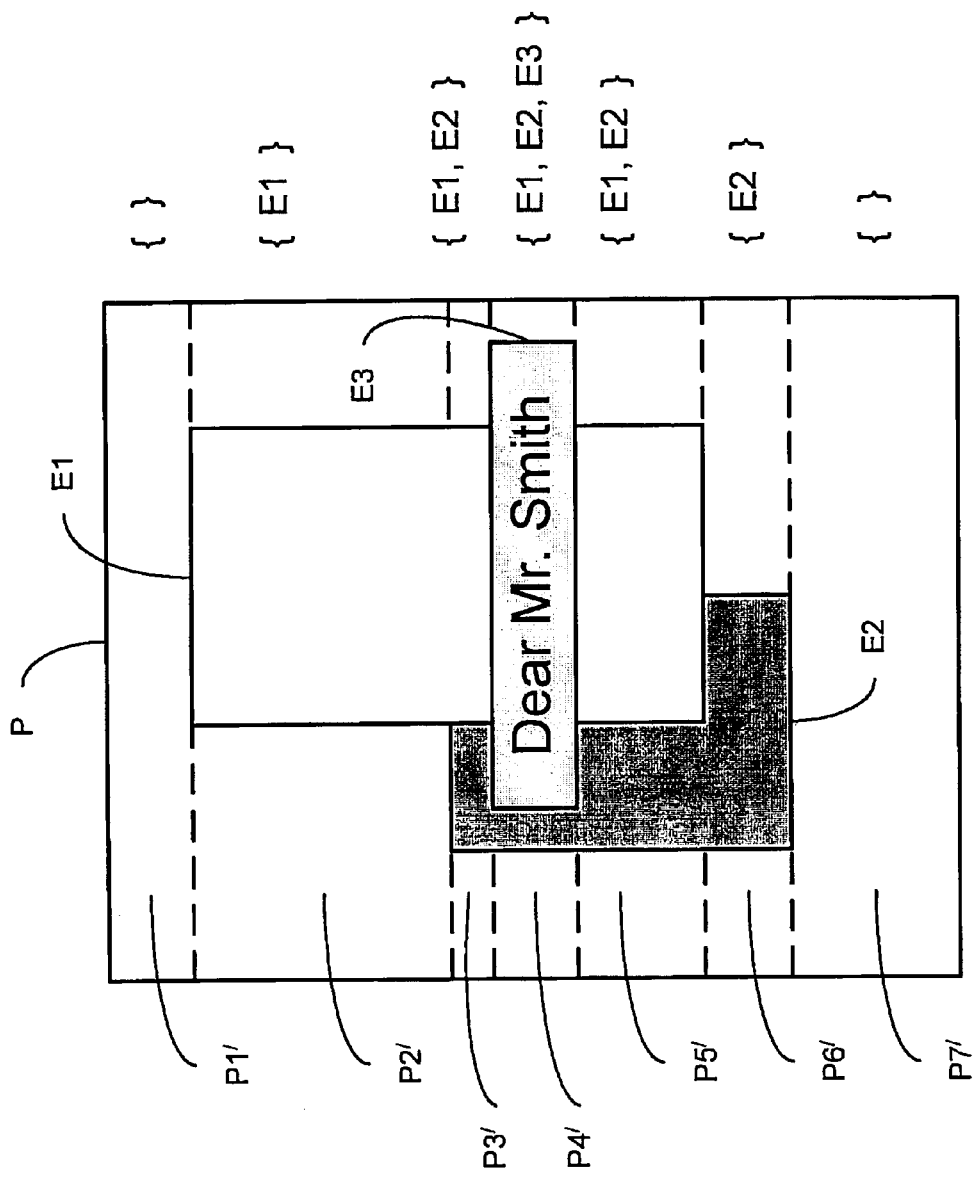

The regions shown in FIG. 3A are of a pre-determined size for all pages in the print job. Reference is now made to FIG. 3C, which is a schematic illustration of the page P of FIG. 3A divided into segment regions, in accordance with another preferred embodiment of the present invention. The segments P1'–P7' of the page P are determined so that each segment will consist of a maximal number of lines that are assembled from the exact same part of the PAL. Thus, segments P1' and P7' have no elements, segment P2' has only element E1, segments P3' and P5' have elements E1 and E2, segment P4' has elements E1, E2 and E3, and segment P6' has only element E2. This division of a page into regions reflects specifies of the page composition and is appropriate for documents where pages share the same layout.

The process for dividing the page P into the segments P1'–P7' will now be described. It is assumed that the PAL of page P is normalized. For any line k, let AL(k) be the part of the PAL that is relevant for that line. The goal is to find maximal regions where for any two lines k and l in the region AL(k) equals AL(l). The process is specified in terms of r, a running line number. It starts from r equal to 1 and repeatedly compares AL(r) with AL(r+1) while incrementing r upon successful comparison and halting once, for some r, AL(r) is not equal to AL(r+1), or when r+1 exceeds the number of lines in the page. Once halted, say for r equal to m, a region boundary was found. The first region will include lines 1 through m, and the process will continue looking for the second region which will start with line number m+1 (assuming m+1 is smaller than the number of lines in the page). Each time the inequality condition from above is detected, a region boundary was found and a new region had been defined. The process is terminated the first time r+1 exceeds the maximal line number in the page. FIG. 3C shows a schematic illustration of the end-result of such process where the regions found are P1' through P7', and their respective ALs are to the right of the page. Since the regions found using this method are of different height, it is necessary to retain with each region its height. This will enable the PAP 36 to compare only regions of identical height. It will be appreciated that the element E1, which is fully covered by element E3 in region P4', appears in the AL for region P4', although it would not appear in a normalized PAL for the region P4'.

Multilayer Printer-Ready Representations

Whereas a full raster representation of a page is the most straightforward representation of printer-ready, there are quite a few other representations. In particular, one that stores the image-type (e.g., scanned pictures) information separately from the non-image (e.g., text, charts) information is interesting. Scitex Corporation of Herzliya, Israel has developed the continuous tone/line work (CT/LW) format which separates the image (CT) data and the non-image (LW) data. Other formats that provide such separation may exist. In this explanation we use CT/LW to mean any format that provides this type of separation.

Typically, the CT parts are very large and consume significant storage as well as processing time. The LW parts are compressed and typically small which makes them less attractive as optimization targets. Another justification to this separation is the observation that in many variable-information print jobs, the CT part remains constant while the changes are restricted to the LW layer (e.g., when only names and addresses are changed). It is thus desirable to apply the "similarity" comparison method above on the CT part only.

In order to apply this method to a part of the page, such as the CT part, it is necessary that the printer-ready representation should allow using the CT layer only or the LW layer only, both at the element level and on the assembled region level.

When transparency of parts of elements needs to be supported for assembling pages, a mechanism is required to distinguish marking areas from non-marking (i.e. transparent) areas of page elements. This can be achieved by using the representation of FIG. 4A, to which reference is now made. When using the CT/LW representation, a marking/non-marking attribute can be added to the LW layer as shown in FIG. 4B, to which reference is now additionally made.

Figure 4A:
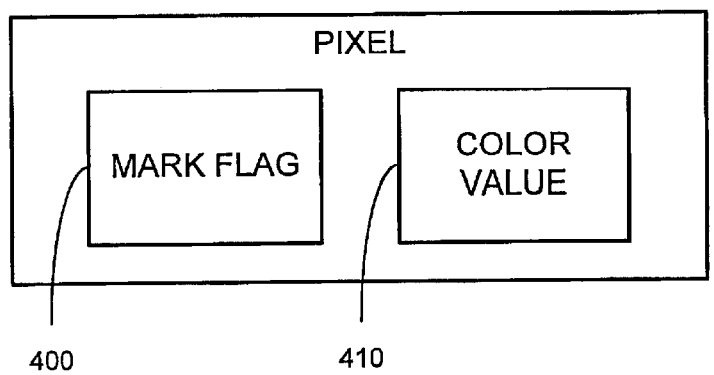
FIGS. 4A and 4B are schematic illustrations of the pixel data, according to a preferred embodiment of the present invention.
Figure 4B:
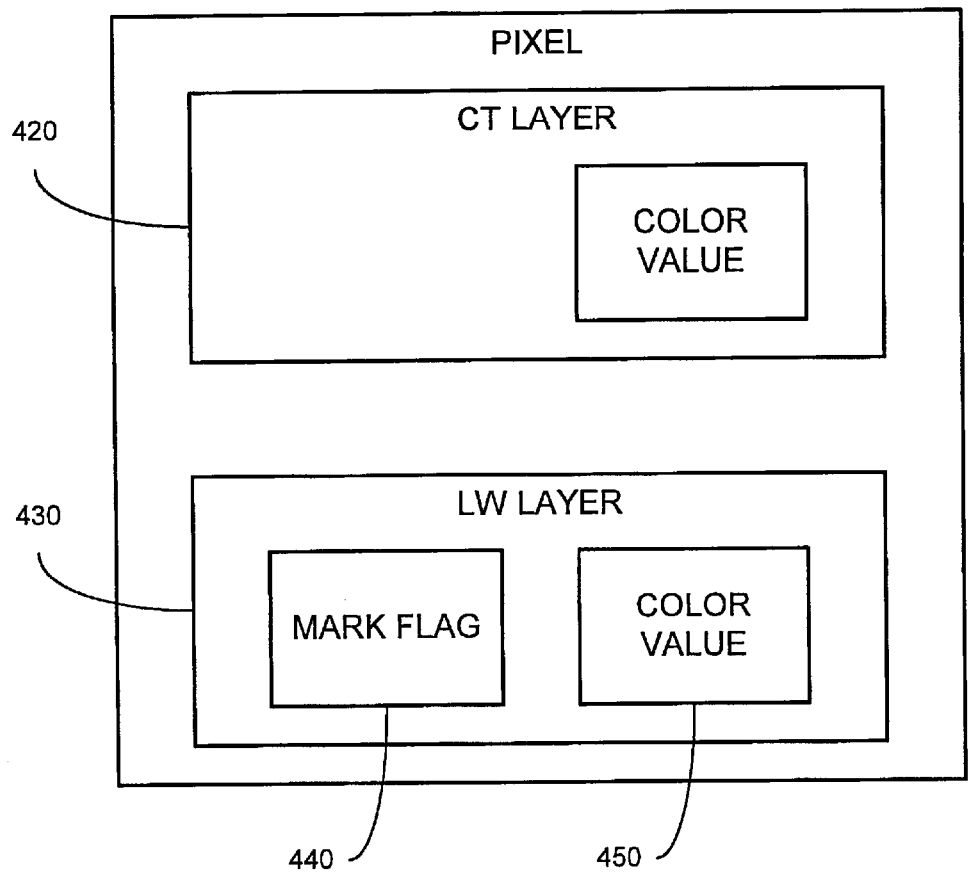

In FIG. 4A, the pixel value is stored in two parts—the color value (or tint) 410, and a "flag" 400 indicating whether the pixel is marking or non-marking. In FIG. 4B, a CT/LW representation is shown where the image (CT) data 420 is represented as one layer, and the rest of the element's data (or line work—LW) 430 is represented in a second layer. The LW layer 430 contains, for each pixel, the color value 450 and a flag 440 that can take one of three values:

a) Tint (marking LW)—this pixel is a marking pixel with the color taken from the LW layer.

b) Window (marking CT)—this pixel is a marking pixel with the color taken from the CT layer.

c) Background (non-marking)—this pixel is a non-marking pixel.

The PAL normalization process mentioned hereinabove suggests the elimination of fully covered elements from the PAL. While in some printer-ready representation this might be a relatively simple task, it becomes a bit demanding in representations that support the marking/non-marking semantics from above. In such cases, it is required to test for each fully-covered element whether its pixels are covered by marking pixels. Using LW, which encodes the marking/non-marking semantics and has run-length encoding, allows making such tests more efficiently—once per run instead of once per pixel.

The present invention provides optimization of page assembly by using previously assembled pages (or regions) to avoid re-assembly. In cases where identical pre-assembled regions can not be found, actual assembly should be performed. When CT/LW representation is used the performance of the assembly process can be enhanced by taking advantage of the marking/non-marking semantics and run-length encoding of the LW layer.

While copying needed elements into the output buffer (as part of the assembly of the region), only marking pixels should be copied; the non-marking pixels are ignored. This is done by consulting flag 440 (LW layer) to decide whether the pixel is marking or non-marking. The run-length encoding allows performing this test once per run (instead of once per pixel).

When pages are described in terms of PALs, it is possible to have pixels that are covered by several overlapping elements. In order to avoid marking such pixels repeatedly with elements that cover then, a Write-Once enhancement is used. The PAL is processed in reverse Z-axis order, and for each pixel, the marking stops once the top-most element covering the pixel had been processed.

With a CT/LW representation this Write-Once method is implemented while supporting the marking/non-marking semantics as given by the LW layer. The method takes advantage of the run-length representation thus examining full runs and not every pixel.

Multiple Output Buffers

Various modifications to the digital printing system of FIG. 2 are described hereinbelow with respect to FIGS. 5 to 10.

Figure 5:
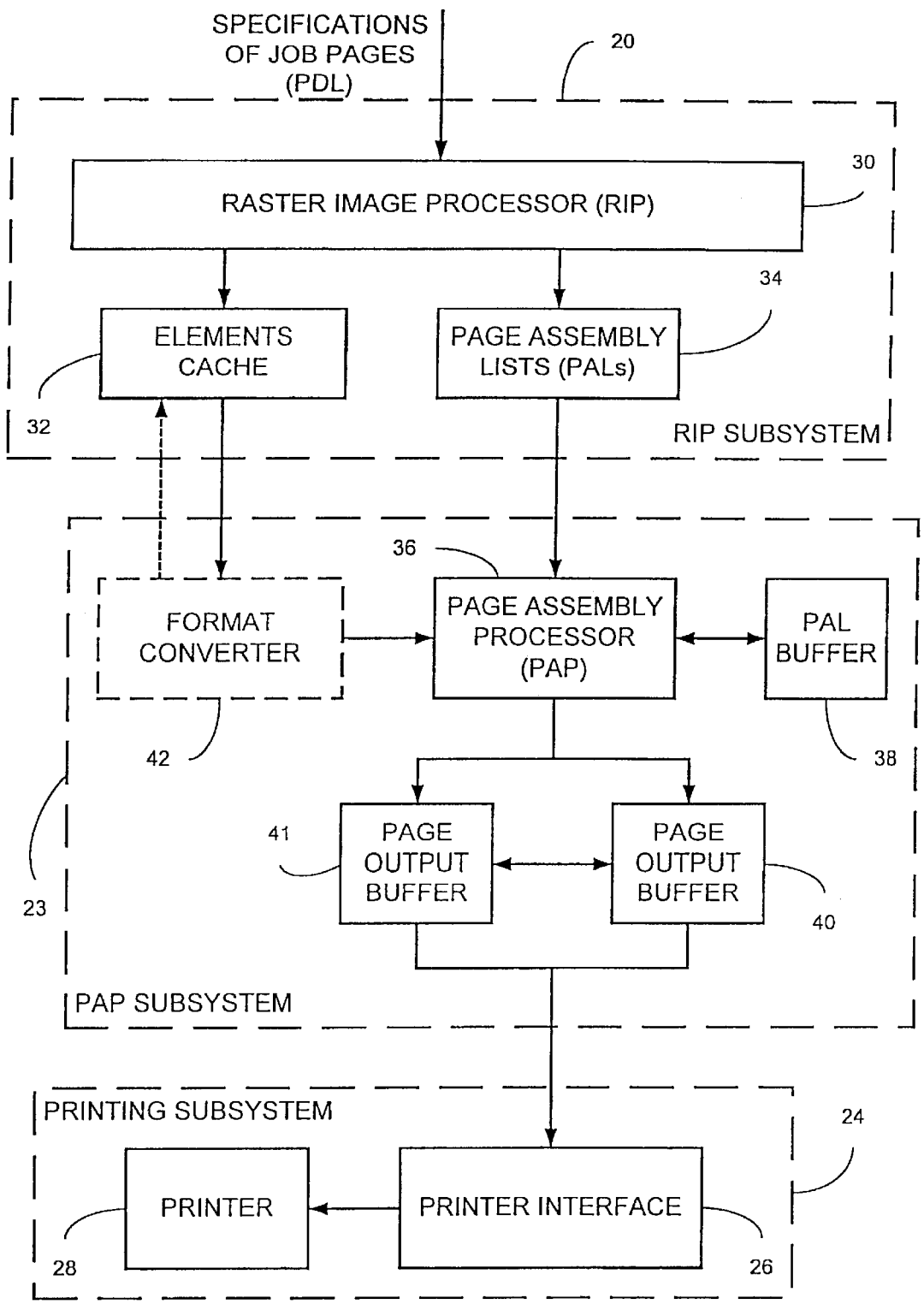
FIG. 5 is a schematic illustration of a digital printing system having connected online double buffers, according to another preferred embodiment of the present invention.

Reference is now made to FIG. 5, which is a schematic illustration of a digital printing system having connected online double buffers, according to another preferred embodiment of the present invention. FIG. 5 is similar to FIG. 2, and the same numerals refer to the same features. In FIG. 5, however, the PAP subsystem 22 of FIG. 2 is replaced by a PAP subsystem 23. The PAP subsystem 23 comprises all the same components as the PAP subsystem 22. In addition, the PAP subsystem 23 comprises a page output buffer 41 which can be copied region by region to the output buffer 40 and vice versa. The PAP subsystem 23 also comprises a multiplexer 39 connecting the PAP 36 to the output buffers 40 and 41, and a demultiplexer 43 connecting the output buffers 40 and 41 online to the printer interface 26.

A the steady-state, one buffer is assigned to the printer interface 26 and the other buffer is assigned to the PAP 36. Once the PAP 36 finishes writing to the buffer assigned to it and the printer interface 26 finishes printing the buffer assigned to it, the switch the buffer assignment. The PAP 36 will write the next page into the buffer that was just printed, and the printer interface 26 will read the buffer that was just written. The process continues until there are no more pages to process. When the PAP 36 is writing into one buffer, it is comparing the regions of the page to be assembled with the regions of the page in the other buffer. Regions that are identical are copied from the buffer assigned to the printer to the buffer assigned to the PAP 36. Regions that are different are assembled from scratch by the PAP 36 into the buffer assigned to it. The PAP subsystem 23 is a double-buffer system that allows online printing of variable information documents with improved performance so that it may be possible to achieve a real-time rate.

According to further preferred embodiments of the present invention, the digital printing systems of FIGS. 2 and 5 may be modified to allow for offline operation. This is accomplished by adding a storage subsystem (not shown) between the output buffers and the printing subsystem.

Figure 6:
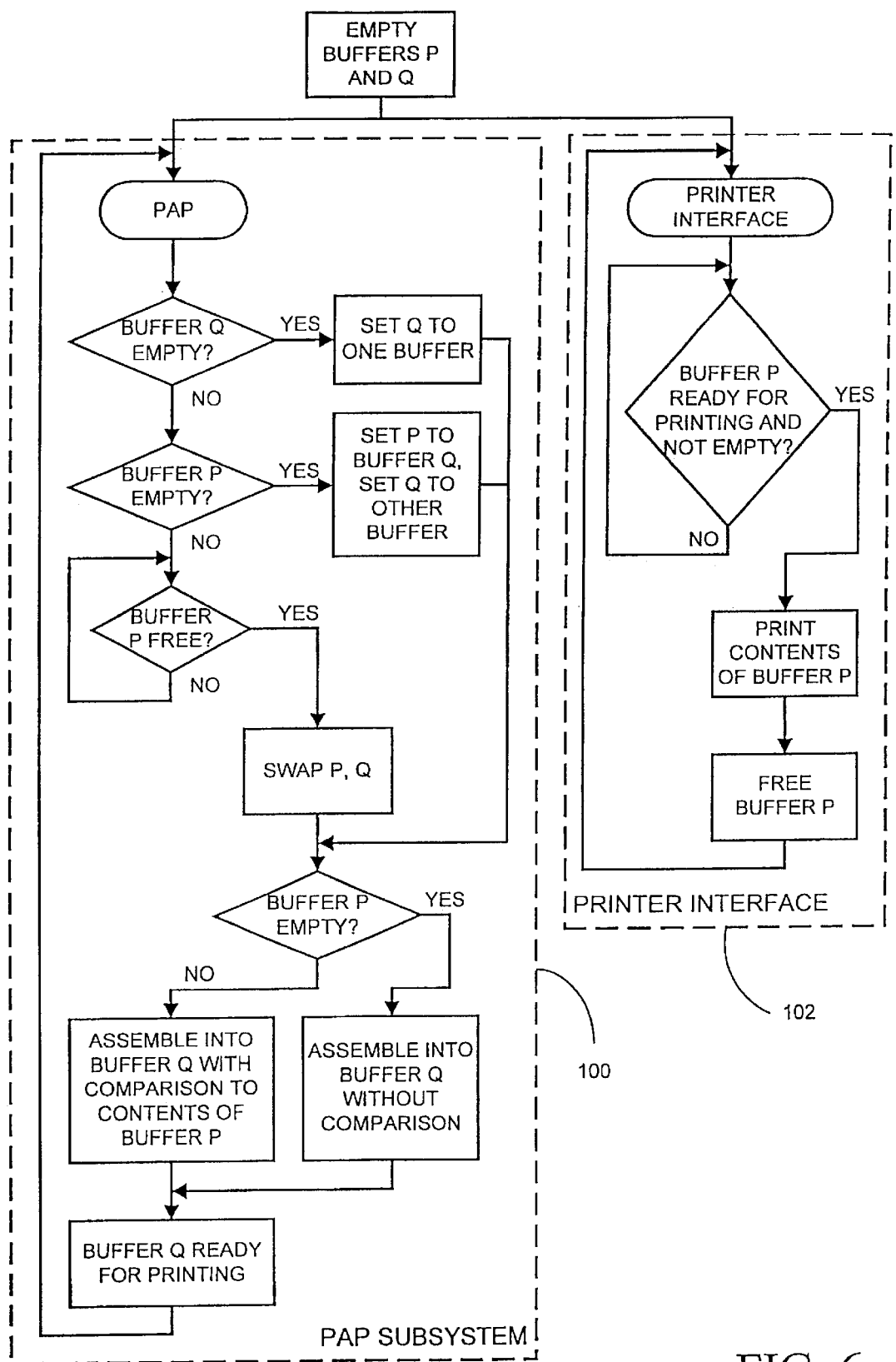
FIG. 6 is a schematic flowchart illustration of a method for operating the system of FIG. 5, according to a preferred embodiment of the present invention.

FIG. 6, to which reference is now made, is a schematic flowchart illustration of a method for operating the system of FIG. 5, according to a preferred embodiment of the present invention P and Q are pointers to the output buffers 40 and 41. At any given time, P points to the buffer that is assigned to the printer interface 26, and Q points to the buffer that is assigned to the PAP subsystem 23. When P is empty, it is not pointing to either buffer. Similarly, when Q is empty, it is not pointing to either buffer. The action "set Q to one buffer" means that Q now points to that buffer. Similarly, the action "set P to buffer Q, set Q to other buffer" means that P now points to the buffer that Q used to point to, and Q now points to the other buffer. The action "Swap P, Q" exchanges the pointer values. When a buffer is free, it is not ready for printing. The PAP process 100 and the printer interface process 102 are performed in parallel.

Figure 7:
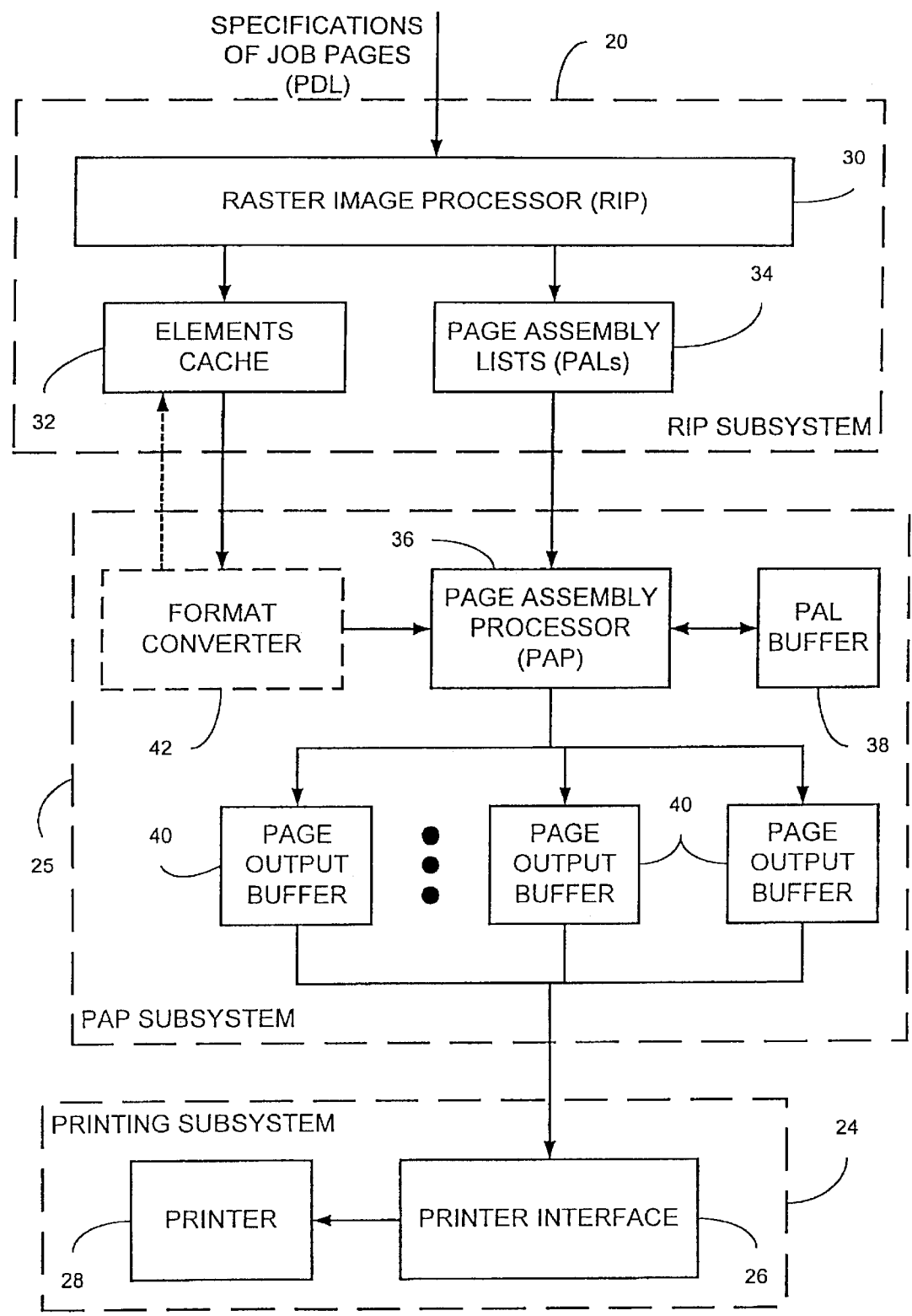
FIG. 7 is a schematic illustration of a digital printing system having multiple online buffers, according to a further preferred embodiment of the present invention.

Reference is now made to FIG. 7, which is a schematic illustration of a digital printing system having multiple online buffers, according to a further preferred embodiment of the present invention. FIG. 7 is similar to FIG. 2, and the same numerals refer to the same features. In FIG. 7, however, the PAP subsystem 22 of FIG. 2 is replaced by a PAP subsystem 25. The PAP subsystem 25 comprises all the same components as the PAP subsystem 22, but comprises also a plurality of output buffers 40, connected to the PAP 36 to the printer interface 26. The presence of a plurality of output buffers 40 allows the PAP 36 a wider range of pages with which to compare the page to be assembled. The PAP 36 is able to write to any of the output buffers 40, and the printer interface 26 is able to read from any of the output buffers 40. An output buffer 40 can be in one of three states: Free, InAssembly, and PrintReady. The PAP 36 can write into any Free buffer and once it starts writing, the buffer's state changes to InAssembly. Once assembly is complete, the buffer's state changes to PrintReady. The printer interface 26 can read only output buffers 40 that are in the PrintReady state. Once the printer interface 26 finishes reading an output buffer 40, the buffer's state changes to Free.

Each output buffer 40 is associated with a given PAL—the one for the page that has been assembled into the buffer. The PAL is stored in the PAL buffer 38. A Free buffer will have the PAL of the most recent page that was assembled into this buffer, except for initial conditions when the PAP and Print processes start and no page has been assembled yet. Implementing a synchronization mechanism between the PAP 36 and the printer interface 26 that will provide the needed mutual exclusion on buffers use as well as sequencing buffers for printing in the specified order is straightforward, and its description is omitted.

A major motivation for this embodiment is that it can address the problem that in variable information print jobs consisting of multi-page booklets, the similarity between two successive pages is probably quite low. In the system of FIG. 2, this may lead to full assembly of every page most of the time. If the job would be processed in page-order, which means that the system processes (and prints) page i of all booklets before processing page i+1 of all booklets, then, due to the expected similarity between same page across booklets, this inefficiency will not be relevant. If on the other hand the job would be processed in booklet-order, which means that the system processes and print the pages of booklet j before processing and printing the pages of booklet j+1, then, due to the expected low degree of similarity between different pages (in the same booklet or across booklets), this inefficiency might be quite damaging.

One way of using the system of FIG. 7, such that it addresses the above-mentioned inefficiency, is to associate one output buffer 40 per page of the booklet (i.e. output buffer k is associated always with page k of every booklet), and to design the PAP 36 so that when processing page k of a booklet, it will use its associated output buffer k for comparison and assembly. Thus if the job is processed in booklet-order, the likelihood of finding matching regions will increase, and the rate of generating printer-ready representations of the pages will remain sufficiently high.

Figure 8:
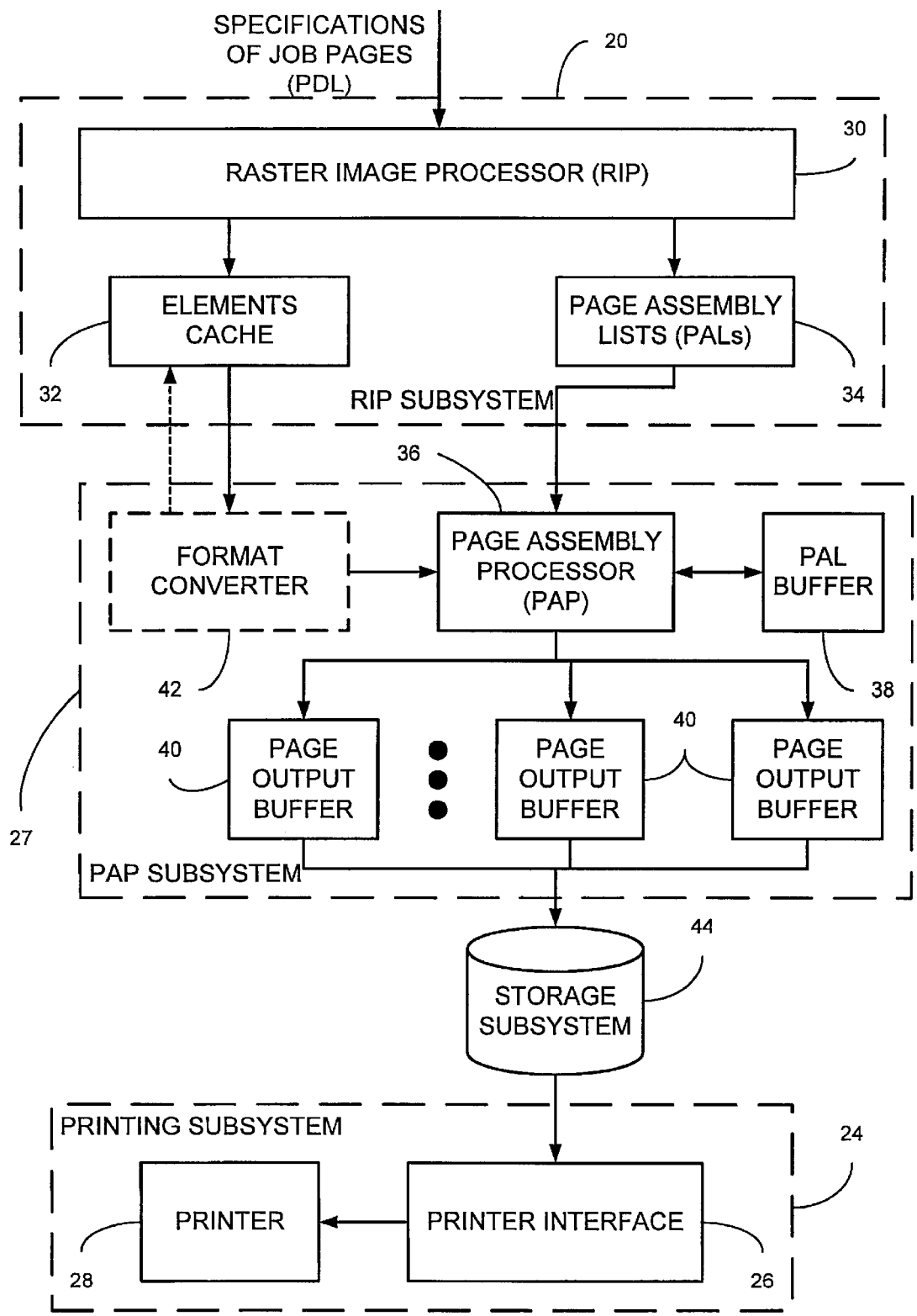
FIG. 8 is a schematic illustration of a digital printing system with an offline storage subsystem, according to an additional preferred embodiment of the present invention.

Reference is now made to FIG. 8, which is a schematic illustration of a digital printing system with an offline storage subsystem, according to an additional preferred embodiment of the present invention. FIG. 8 is similar to FIG. 2, and the same numerals refer to the same features. In FIG. 8, however, the PAP subsystem 22 of FIG. 2 is replaced by a PAP subsystem 27, and a storage subsystem 44 connects the PAP subsystem 27 and the printing subsystem 24. The PAP subsystem 27 comprises all the same components as the PAP subsystem 22, but comprises also a plurality of output buffers 40. The output buffers 40 are not connected online to the printer interface 26. Rather, the printer-ready representations of pages assembled by the PAP 36 are stored in the storage subsystem 44. At any stage, the printer interface 26 may check whether enough pages are already stored and start printing by reading the printer-ready representations from the storage subsystem 44 and printing the pages.

Figure 9:
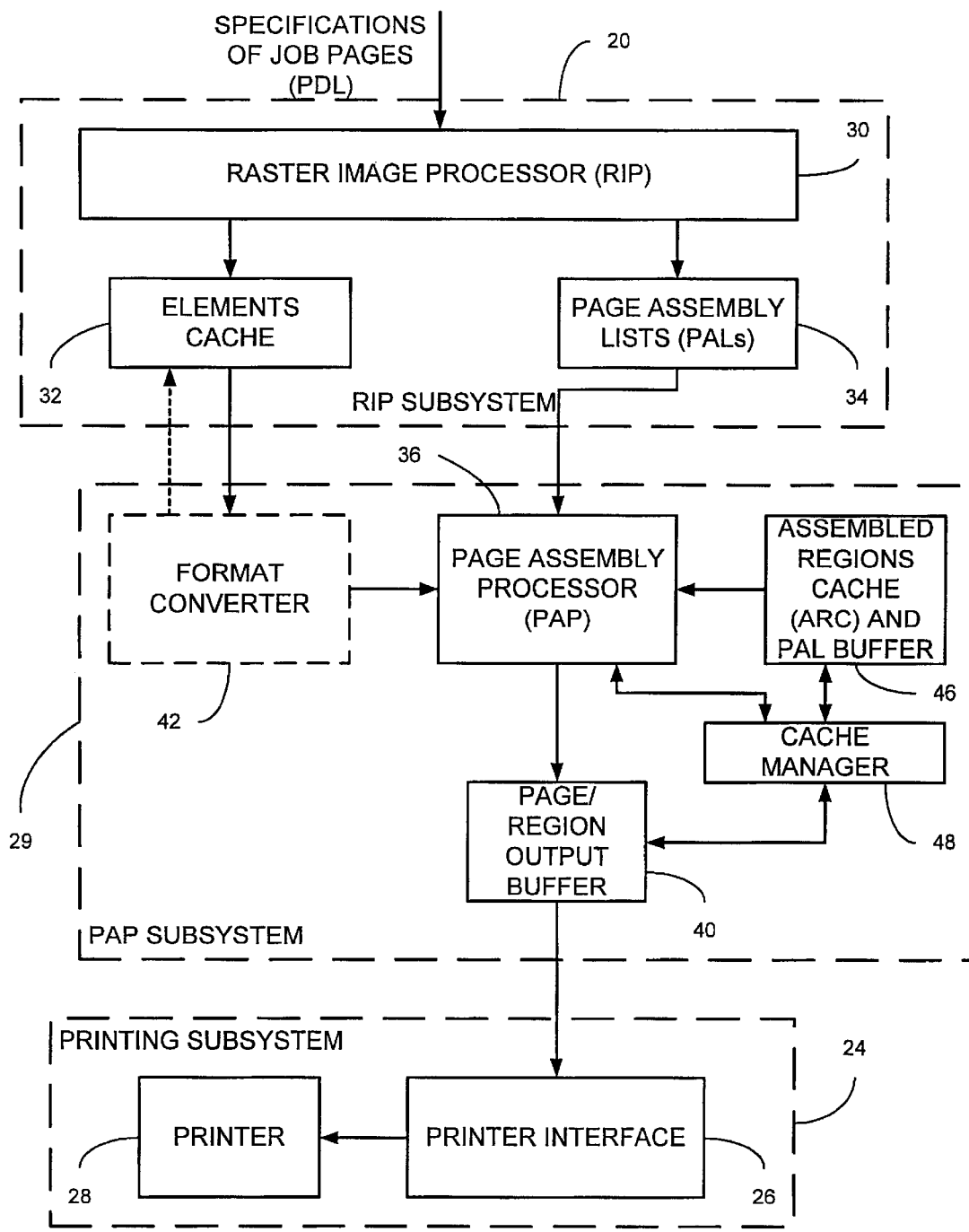
FIG. 9 is a schematic illustration of a digital printing system with an assembled regions cache (ARC), according to a preferred embodiment of the present invention.

Reference is now made to FIG. 9, which is a schematic illustration of a digital printing system with an assembled regions cache (ARC), according to yet another preferred embodiment of the present invention, FIG. 9 is similar to FIG. 2, and the same numerals refer to the same features. In FIG. 9, however, the PAP subsystem 22 of FIG. 2 is replaced by a PAP subsystem 29. The PAP subsystem 29 comprises the PAP 36, the output buffer 40, and the format converter 42. The PAP subsystem 29 also comprises an assembled regions cache (ARC) 46 and a cache manager 48, connected to each other and both connected to the PAP 36. The ARC 46 comprises the PAL buffer 38 of FIG. 2. The cache manager 48 is also connected to the output buffer 40.

For each region of a page to be assembled, the PAP 36 compares the PAL for the region with PALs of printer-ready regions stored in the ARC 46, as well as with the PAL of the most-recently assembled page or region that is currently in the output buffer 40. If a stored printer-ready region in the ARC 46 is identical to that defined by the PAL for the region of the page to be assembled, then it is copied to the memory regions of the output buffer 40 corresponding to this region. If no identical stored printer-ready region is found in the ARC 46, and the region currently in the output buffer 40 is not identical to that defined by the PAL for the region of the page to be assembled, then the PAP 36 assembles the region from scratch. The cache manager 48 copies newly assembled regions to the ARC 46. Since the ARC 46 is typically limited in size, the cache manager 48 must employ a policy to choose which stored regions to remove from the ARC 46 when a newly assembled region is to be stored in the ARC 46.

Several statistical cache management policies that are known in the general art of computer science can be applied here. One policy is the simple First-in-First-Out (FIFO) policy. Regions in the ARC 46 are associated with a time stamp and are stamped upon entry into the ARC 46. When space is needed, the cache manager 48 removes the region with the oldest time stamp from the ARC 46.

Another policy is the Least Used (LU) policy. A use count is kept with each region and is incremented by one whenever the region is copied into the output buffer 40 or remains in the output buffer 40. When space is needed, the cache manager 48 removes the region with the smallest use count from the ARC 46.

Yet another policy is the Least Recently Used (LRU) policy. Regions in the ARC 46 are associated with a timestamp and are stamped whenever a region is copied into the output buffer 40 or remains in the output buffer 40. When space is needed, the cache manager 48 removes the region with the oldest time-stamp. The choice of policy depends on print job statistics and on the amount of memory available for the ARC 46.

Job-specific policies require that a special initiation set-up will be performed prior to job start. One such policy may involve marking of certain regions in the ARC 46 as locked. These can be, for example, regions that belong to pages that do not change at all from booklet to booklet. These can be also regions that cover certain parts in the plane of the pages; one will choose such a policy when it is known that for this job, for example, the top third of all is identical.

The cache-based system of FIG. 9 is suitable for architectures where moving fully assembled regions between the ARC 46 and the output buffer 40 is significantly faster than the assembly of such regions from elements in the elements cache 32. In particular, it is suitable in systems where generating the final data for output involves some additional processing that is not needed for generating printer-ready representations of elements into the elements cache 32. One such example is when the printer-ready representation of regions involves compression and the printer-ready representation of elements does not involve compression.

It will be appreciated by those skilled in the art that all of the solutions described herein can be applied to the full printer-ready representation of elements, regions, or pages, as well as to the parts that describe a specific "layer" of such representation. A typical layer example is the CT layer described above (see FIG. 4B). When a layer approach is used then the relevant layer is processed through the various optimization mechanisms described here and the non-relevant layers are processed with no optimizations.

Figure 10:
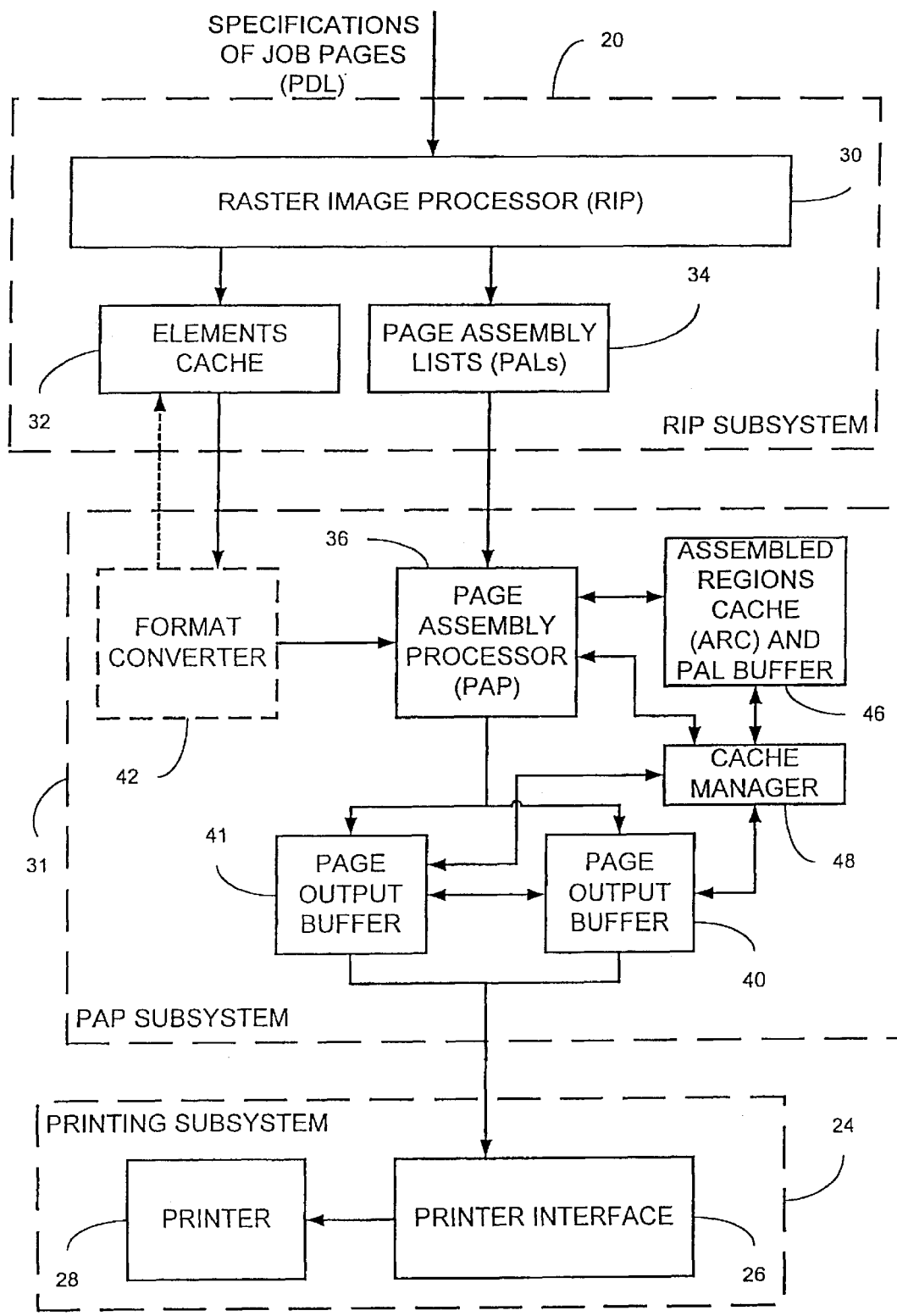
FIG. 10 is a schematic illustration of a digital printing system with an ARC and connected online double buffers, according to another preferred embodiment of the present invention.

Reference is now made to FIG. 10, which is a schematic illustration of a digital printing system with an ARC 46 and connected online double buffers, according to another preferred embodiment of the present invention. FIG. 9 is similar to FIGS. 5 and 9, and the same numerals refer to the same features. The operation of the system of FIG. 10 is similar to that of FIG. 9, in that the PAP 36 looks for regions both in the ARC 46 and in the output buffers 40 and 41. It is similar to that of FIG. 5 (and the method shown in FIG. 6), in that connected online double buffers are swapped between the PAP and the printer interface.

According to further preferred embodiments of the present invention, the PAP 36 has access to memory that is much larger than the ARC 46—possibly a disk—that has in it many more regions than what the ARC 46 can store. For example, the systems of FIGS. 9 and 10 are extended to use a disk file as an interface between the PAP subsystem and the printing subsystem 24. As another example, the system of FIGS. 9 and 10 are implemented such that the PAP subsystem is done with special hardware having special memory assigned on the boards for the ARC 46, and the general-purpose computer memory could serve as the larger (and slower) memory.

In such cases, the comparison process, which by definition uses PALs, can decide to search for a matching region among all the different PALs that represent the pages in the ARC 46 and in the larger memory. If a match was found—a region that is identical the one currently needed—then, if the found region is not in the ARC 46, this region can be copied either to the ARC 46 or to the output buffer. If copied to the output buffer it should be marked as "newly assembled" so that the cache member 48 will copy to it the ARC 46, as described hereinabove. If copied to the ARC 46 then it will have to be further copied from ARC 46—as a matched region—to the output buffer; this may involve also the removal policy of the cache manager 48. Both options are acceptable, and the decision to use one or the other may depend on the system architecture.

According to further preferred embodiments of the present invention, the digital printing systems of FIGS. 9 and 10 may be modified to allow for offline operation. This is accomplished by adding a storage subsystem (not shown) between the output buffer(s) and the printing subsystem.

Searching for a Matching Region

When the PAP 36 searches for a printer-ready region that is identical to that described by the PAL of the page to be assembled, the PAP 36 searches the ARC 46 and, as described hereinabove, may also search an additional set of regions stored in a storage subsystem. If the total number of stored regions is small, then the PAP 36 could explicitly compare the PAL of the page to be assembled to the PAL of each stored region until a match is found. However, if the total number of stored regions is large, this is not feasible.

As described hereinabove, when the PALs are normalized, they can be compared lexically. According to a preferred embodiment of the present invention, a hashing function is used on the text of normalized PALs. This allows the PAP 36 to perform a much faster lookup in the case of many stored regions.

An additional preferred embodiment of the present invention enhances the search for a matching region by using the dimension of the region as a major search criterion, for the case where the regions are of non-uniform dimensions.

A further preferred embodiment of the present invention enhances the search for a matching region in the case of assembling page k of a booklet, by searching for matching regions only among those regions that were defined by pages k of previous booklets.

It will be appreciated by those skilled in the art that the search techniques described herein may be used independently or may be combined.

It will be appreciated by persons skilled in the art that the present invention is not limited by what has been particularly shown and described herein above. Rather the scope of the invention is defined by the claims that follow:

What is claimed is:

1. A method for generating printer-ready representations of pages having regions described by page assembly instructions, the method comprising the steps of:
    comparing the page assembly instructions of each region of a current page with the page assembly instructions of each equivalent region of a previous page having a printer-ready representation; and
    generating the printer-ready representation of said current page by:
        reusing a portion of the printer-ready representation of said previous page, said portion corresponding to each region of said previous page that is similar to the equivalent region of said current page; and
        assembling each region of said current page that is not similar to the equivalent region of said previous page.

2. A method according to claim 1, wherein page assembly instructions include references to page elements and an indication of locations of each of said page elements in an assembled page, the order of said references providing covering semantics, and said step of comparing comprises the steps of:
    normalizing said page assembly instructions according to said locations while retaining said covering semantics; and
    lexically comparing said normalized page assembly instructions.

3. A method according to claim 2, wherein said step of normalizing comprises the steps of:
    ranking each of said references according to whether the page element it refers to covers at least part of at least one other of said page elements; and
    sorting said references within each rank according to said locations.

4. A method according to claim 3, wherein said step of normalizing further comprises the step of:
    removing from said page assembly instructions references to page elements that are fully covered.

5. A method according to claim 1, wherein
    the printer-ready representation of said previous page is stored in a buffer,
    said step of reusing comprises the step of leaving said portion in said buffer, and
    said step of assembling assembles into said buffer.

6. A method according to claim 1, wherein
    the printer-ready representation of said previous page is stored in a first buffer,
    said step of reusing comprises the step of copying said portion from said first buffer to a second buffer, and
    said step of assembling assembles into said second buffer.

7. A method according to claim 1, wherein said previous page is not necessarily the page whose printer-ready representation was most recently generated.

8. A method according to claim 1, wherein said previous page is one of a plurality of pages whose printer-ready representations were recently generated and are stored in a corresponding plurality of buffers.

9. A method according to claim 8, wherein said step of comparing compares the page assembly instructions of each region of said current page with the page assembly instructions of each equivalent region of a selected one of said plurality of pages.

10. A method for generating printer-ready representations of pages having regions described by page assembly instructions, the method comprising the steps of:
    a) comparing the page assembly instructions of each region of a current page with the page assembly instructions of each equivalent region of a previous page whose printer-ready representation is stored in a first buffer; and substantially concurrently with reading of said first buffer, generating the printer-ready representation of said current page into a second buffer by:
        copying a portion of the printer-ready representation of said previous page from said first buffer to said second buffer, said portion corresponding to each region of said previous page that is similar to the equivalent region of said current page; and
        assembling into said second buffer each region of said current page that is not similar to the equivalent region of said previous page;
    b) after said step of generating and said reading of said first buffer are completed, comparing the page assembly instructions of each region of a next page with the page assembly instructions of each equivalent region of said current page; and substantially concurrently with reading of said second buffer, generating the printer-ready representation of said next page into said first buffer by:
        copying a portion of the printer-ready representation of said current page from said second buffer to said first buffer, said portion corresponding to each region of said current page that is similar to the equivalent region of said next page; and
        assembling into said first buffer each region of said next page that is not similar to the equivalent region of said current page; and
    c) repeating step a) and step b) sequentially until there are no more printer-ready representations of pages to generate.

11. A method for generating printer-ready representations of pages having regions described by page assembly instructions, the method comprising the steps of:
    comparing the page assembly instructions of each region of a current page with the page assembly instructions of cache regions having printer-ready region representations stored in a cache; and
    generating the printer-ready representation of said current page into a buffer by:
        for each cache region that is similar to a region of said current page, copying its printer-ready region representation from said cache to said buffer; and
        assembling into said buffer each region of said current page that is not similar to any of said cache regions.

12. A method for generating printer-ready representations of pages having regions described by page assembly instructions, the method comprising the steps of:
    comparing the page assembly instructions of each region of a current page with the page assembly instructions of each equivalent region of a previous page whose printer-ready representation is stored in a buffer and with the page assembly instructions of cache regions having printer-ready region representations stored in a cache; and generating the printer-ready representation of said current page into said buffer by:
    leaving a portion of the printer-ready representation of said previous page in said buffer, said portion corresponding to each region of said previous page that is similar to the equivalent region of said current page;
    for each region of said current page that is not similar to the equivalent region of said previous page and is similar to a cache region, copying the printer-ready region representation of said cache region from said cache to said buffer; and
    assembling into said buffer each region of said current page that is not similar to any of said cache regions and is not similar to the equivalent region of said previous page.

13. A method for generating printer-ready representations of pages having regions described by page assembly instructions, the method comprising the steps of:
    comparing the page assembly instructions of each region of a current page with the page assembly instructions of each equivalent region of a previous page whose printer-ready representation is stored in a first buffer and with the page assembly instructions of cache regions having printer-ready region representations stored in a cache; and
    generating the printer-ready representation of said current page into a second buffer by:
        copying a portion of the printer-ready representation of said previous page from said first buffer to said second buffer, said portion corresponding to each region of said previous page that is similar to the equivalent region of said current page;
        for each region of said current page that is not similar to the equivalent region of said previous page and is similar to a cache region, copying the printer-ready region representation of said cache region from said cache to said second buffer; and
        assembling into said second buffer each region of said current page that is not similar to any of said cache regions and is not similar to the equivalent region of said previous page.

14. A method for generating printer-ready representations of pages having regions described by page assembly instructions, the method comprising the steps of:
    a) comparing the page assembly instructions of each region of a current page with the page assembly instructions of each equivalent region of a previous page whose printer-ready representation is stored in a first buffer and with the page assembly instructions of cache regions having printer-ready region representations stored in a cache; and substantially concurrently with reading of said first buffer, generating the printer-ready representation of said current page into a second buffer by:
        copying a portion of the printer-ready representation of said previous page from said first buffer to said second buffer, said portion corresponding to each region of said previous page that is similar to the equivalent region of said current page;
        for each region of said current page that is not similar to the equivalent region of said previous page and is similar to a cache region, copying the printer-ready region representation of said cache region from said cache to said second buffer; and
        assembling into said second buffer each region of said current page that is not similar to any of said cache regions and is not similar to the equivalent region of said previous page;
    b) after said step of generating and said reading of said first buffer are completed, comparing the page assembly instructions of each region of a next page with the page assembly instructions of each equivalent region of said current page and with the page assembly instructions of said cache regions, and substantially concurrently with reading of said second buffer, generating the printer-ready representation of said next page into said first buffer by:
        copying a portion of the printer-ready representation of said current page from said second buffer to said first buffer, said portion corresponding to each region of said current page that is similar to the equivalent region of said next page;
        for each region of said next page that is not similar to the equivalent region of said current page and is similar to a cache region, copying the printer-ready region representation of said cache region from said cache to said first buffer; and
        assembling into said first buffer each region of said next page that is not similar to any of said cache regions and is not similar to the equivalent region of said current page; and
    c) repeating step a) and step b) sequentially until there are no more printer-ready representations of pages to generate.

15. A method for determining the identity of images described by page assembly instructions having references to page elements and an indication of locations of each of said page elements in an assembled page, the order of said references providing covering semantics, the method comprising the steps of:
    normalizing said page assembly instructions according to said locations while retaining said covering semantics;
    lexically comparing said normalized page assembly instructions; and
    determining that said images are identical when said normalized page assembly instructions are lexically identical.

16. A method according to claim 15, wherein said step of normalizing comprises the steps of:
    ranking each of said references according to whether the page element it refers to covers at least part of at least one other of said page elements; and
    sorting said references within each rank according to said locations.

17. A method according to claim 16, wherein said step of normalizing further comprises the step of:
    removing from said page assembly instructions references to page elements that are fully covered.

18. A method for generating printer-ready representations of pages having regions described by page assembly instructions, the printer-ready representations and the page assembly instructions separable into multiple layers, the method comprising the steps of:
    selecting at least one of said multiple layers;
    for each selected layer:
        comparing the page assembly instructions of each region of a current page with the page assembly instructions of each equivalent region of a previous page having a printer-ready representation; and
        generating said selected layer of the printer-ready representation of said current page by:

reusing a portion of said selected layer of the printer-ready representation of said previous page, said portion corresponding to each region of said previous page that is similar to the equivalent region of said current page; and assembling each region of said current page that is not similar to the equivalent region of said previous page.

19. A method according to claim 18, wherein said multiple layers include a continuous tone (CT) layer and a line work (LW) layer, and wherein said at least one selected layer includes said CT layer.

20. A method according to claim 18, wherein page assembly instructions include references to page elements and an indication of locations of each of said page elements in an assembled page, the order of said references providing covering semantics, and said step of comparing comprises the steps of:

normalizing said page assembly instructions according to said locations while retaining said covering semantics; and lexically comparing said normalized page assembly instructions.

21. A method according to claim 20, wherein said step of normalizing comprises the steps of:

ranking each of said references according to whether the page element it refers to covers at least part of at least one other of said page elements; and sorting said references within each rank according to said locations.

22. A method according to claim 21, wherein said step of normalizing further comprises the step of:

removing from said page assembly instructions references to page elements that are fully covered.

23. A method according to claim 18, wherein the printer-ready representation of said previous page is sorted in a buffer, said step of reusing comprises the step of leaving said portion in said buffer, and said step of assembles into said buffer.

24. A method according to claim 18, wherein the printer-ready representation of said previous page is stored in a first buffer, said step of reusing comprises the step of copying said portion from said first buffer to a second buffer, and said step of assembling assembles into said second buffer.

25. A method according to claim 18, wherein said previous page is not necessarily the page whose printer-ready representation was most recently generated.

26. A method according to claim 18, wherein said previous page is one of a plurality of pages whose printer-ready representations were recently generated and are stored in a corresponding plurality of buffers.

27. A method according to claim 26, wherein said step of comparing compares the page assembly instructions of each region of said current page with the page assembly instructions of each equivalent region of a selected one of said plurality of pages.

28. A method for generating printer-ready representations of pages having regions described by page assembly instructions, the printer-ready representations and the page assembly instructions separable into multiple layers, the method comprising the steps of:

a) selecting at least one of said multiple layers;

b) for each selected layer:

comparing the page assembly instructions of each region of a current page with the page assembly instructions of each equivalent region of a previous page whose printer-ready representation is stored in a first buffer; and substantially concurrently with reading of said first buffer, generating said selecting layer of the printer-ready representation of said current page into a second buffer by:

copying a portion of said selected layer of the printer-ready representation of said previous page from said first buffer to said second buffer, said portion corresponding to each region of said previous page that is similar to the equivalent region of said current page; and assembling into said second buffer each region of said current page that is not similar to the equivalent region of said previous page;

c) after said step of generating and said region of said first buffer are completed, for each selected layer:

comparing the page assembly instructions of each region of a next page with the page assembly instructions of each equivalent region of said current page; and substantially concurrently with reading of said second buffer, generating said selected layer of the printer-ready representation of said next page into said first buffer by:

copying a portion of said selected layer of the printer-ready representation of said current page from said second buffer to said first buffer, said portion corresponding to each region of said current page that is similar to the equivalent region of said next page; and assembling into said first buffer each region of said next page that is not similar to the equivalent region of said current page; and d) repeating step b) and step c) sequentially until there are no more printer-ready representations of pages to generate.

29. A method according to claim 28, wherein said multiple layers include a continuous tone (CT) layer and a line work (LW) layer, and wherein said at least one selected layer includes said CT layer.

30. A method for generating printer-ready representations of pages having regions described by page assembly instructions, the printer-ready representations and the page assembly instructions separable into multiple layers, the method comprising the steps of:

selecting at least one of said multiple layers;

for each selected layer:

comparing the page assembly instructions of each region of a current page with the page assembly instructions of cache regions having printer-ready region representations stored in a cache; and generating said selected layer of the printer-ready representation of said current page into a buffer by:

for each cache region that is similar to a region of said current page, copying said selected layer of its printer-ready region representation from said cache to said buffer; and assembling into said buffer each region of said current page that is not similar to any of said cache regions.

31. A method according to claim 30, wherein said multiple layers include a continuous tone (CT) layer and a line work (LW) layer, and wherein said at least one selected layer includes said CT layer.

32. A method for generating printer-ready representations of pages having regions described by page assembly instructions, the printer-ready representations and the page assembly instructions separable into multiple layers, the method comprising the steps of:

selecting at least one of said multiple layers;

for each selected layer:

comparing the page assembly instructions of each region of a current page with the page assembly instructions of each equivalent region of a previous page whose printer-ready representation is stored in a buffer and with the page assembly instructions of cache regions having printer-ready region representations stored in a cache; and generating said selected layer of the printer-ready representation of said current page into said buffer by:

leaving a portion of said selected layer of the printer-ready representation of said previous page in said buffer, said portion corresponding to each region of said previous page that is similar to the equivalent region of said current page;

for each region of said current page that is not similar to the equivalent region of said previous page and is similar to a cache region, copying said selected layer of the printer-ready region representation of said cache region from said cache to said buffer; and assembling into said buffer each region of said current page that is not similar to any of said cache regions and is not similar to the equivalent region of said previous page.

33. A method according to claim 32, wherein said multiple layers include a continuous tone (CT) layer and a line work (LW) layer, and wherein said at least one selected layer includes said CT layer.

34. A method for generating printer-ready representations of pages having regions described by page assembly instructions, the printer-ready representations and the page assembly instructions separable into multiple layers, the method comprising the steps of:

selecting at least one of said multiple layers;

for each selected layer:

comparing the page assembly instructions of each region of a current page with the page assembly instructions of each equivalent region of a previous page whose printer-ready representation is stored in a first buffer and with the page assembly instructions of cache regions having printer-ready region representations stored in a cache; and generating said selected layer of the printer-ready representation of said current page into a second buffer by:

copying a portion of said selected layer of the printer-ready representation of said previous page from said first buffer to said second buffer, said portion corresponding to each region of said previous page that is similar to the equivalent region of said current page;

for each region of said current page that is not similar to the equivalent region of said previous page and is similar to a cache region, copying said selected layer of the printer-ready region representation of said cache region from said cache to said second buffer; and assembling into said second buffer each region of said current page that is not similar to any of said cache regions and is not similar to the equivalent region of said previous page.

35. A method according to claim 34, wherein said multiple layers include a continuous tone (CT) layer and a line work (LW) layer, and wherein said at least one selected layer includes said CT layer.

36. A method for generating printer-ready representations of pages having regions described by page assembly instructions, the printer-ready representations and the page assembly instructions separable into multiple layers, the method comprising the steps of:

a) selecting at least one of said multiple layers;

b) for each selected layer:

comparing the page assembly instructions of each region of a current page with the page assembly instructions of each equivalent region of a previous page whose printer-ready representation is stored in a first buffer and with the page assembly instructions of cache regions having printer-ready region representations stored in a cache; and substantially concurrently with reading of said first buffer, generating said selected layer of the printer-ready representation of said current page into a second buffer by:

copying a portion of said selected layer of the printer-ready representation of said previous page from said first buffer to said second buffer, said portion corresponding to each region of said previous page that is similar to the equivalent region of said current page;

for each region of said current page that is not similar to the equivalent region of said previous page and is similar to a cache region, copying said selected layer of the printer-ready region representation of said cache region from said cache to said second buffer; and assembling into said second buffer each region of said current page that is not similar to any of said cache regions and is not similar to the equivalent region of said previous page;

c) after said step of generating and said reading of said first buffer are completed, for each selected layer:

comparing the page assembly instructions of each region of a next page with the page assembly instructions of each equivalent region of said current page and with the page assembly instructions of said cache regions, and substantially concurrently with reading of said second buffer, generating said selected layer of the printer-ready representation of said next page into said first buffer by:

copying a portion of said selected layer of the printer-ready representation of said current page from said second buffer to said first buffer, said portion corresponding to each region of said current page that is similar to the equivalent region of said next page;

for each region of said next page that is not similar to the equivalent region of said current page and is similar to a cache region, copying said selected layer of the printer-ready region representation of said cache region from said cache to said first buffer; and assembling into said first buffer each region of said next page that is not similar to any of said cache regions and is not similar to the equivalent region of said current page; and d) repeating step b) and step c) sequentially until there are no more printer-ready representations of pages to generate.

37. A method according to claim 36, wherein said multiple layers include a continuous tone (CT) layer and a line work (LW) layer, and wherein said at least one selected layer includes said CT layer.

38. A system for generating printer-ready representations of pages having regions described by page assembly instructions, the system comprising:
- a buffer storing the printer-ready representation of a previous page; and
- a page assembly processor connected to said buffer
  - for comparing the page assembly instructions of each region of a current page with the page assembly instructions of each equivalent region of said previous page, and
  - for assembling into said buffer each region of said current page that is not similar to the equivalent region of said previous page.

39. A system according to claim 38, wherein page assembly instructions include references to page elements and an indication of locations of each of said page elements in an assembled page, the order of said references providing covering semantics, and said page assembly processor further comprises:
- means for normalizing said page assembly instructions according to said locations while retaining said covering semantics; and
- means for lexically comparing said normalized page assembly instructions.

40. A system according to claim 39, wherein said means for normalizing comprises:
- means for ranking each of said references according to whether the page element it refers to covers at least part of at least one other of said page elements; and
- means for sorting said references within each rank according to said locations.

41. A system according to claim 40, wherein said means for normalizing further comprises:
- means for removing from said page assembly instructions references to page elements that are fully covered.

42. A system for generating printer-ready representations of pages having regions described by page assembly instructions, the system comprising:
- a first buffer storing the printer-ready representation of a previous page;
- a second buffer connected to said first buffer; and
- a page assembly processor connected to said first buffer and said second buffer
  - for comparing the page assembly instructions of each region of a current page with the page assembly instructions of each equivalent region of said previous page;
  - for copying from said first buffer to said second buffer a portion of the printer-ready representation of said previous page, said portion corresponding to each region of said previous page that is similar to the equivalent region of said current page; and
  - for assembling into said second buffer each region of said current page that is not similar to the equivalent region of said previous page.

43. A system for generating printer-ready representations of pages having regions described by page assembly instructions, the system comprising:
- a plurality of buffers, each buffer storing the printer-ready representation of one of a corresponding plurality of previous pages; and
- a page assembly processor connected to said buffers
  - for comparing the page assembly instructions of each region of a current page with the page assembly instructions of each equivalent region of a selected one of said previous pages, the printer-ready representation of said selected one of said previous pages stored in a corresponding selected one of said buffers, and
  - for assembling into said selected one of said buffers each region of said current page that is not similar to the equivalent region of said selected one of said previous pages.

44. A system for generating printer-ready representations of pages having regions described by page assembly instructions, the system comprising:
- a buffer storing the printer-ready representation of a previous page;
- a cache storing printer-ready region representations of cache regions; and
- a page assembly processor connected to said buffer and said cache
  - for comparing the page assembly instructions of each region of a current page with the page assembly instructions of each equivalent region of said previous page and with the page assembly instructions of said cache regions,
  - for each region of said current page that is not similar to the equivalent region of said previous page and is similar to a cache region, for copying the printer-ready region representation of said cache region from said cache to said buffer, and
  - for assembling into said buffer each region of said current page that is not similar to any of said cache regions and is not similar to the equivalent region of said previous page.

45. A system according to claim 44, the system further comprising:
- a cache manager connected to said buffer, said cache and said page assembly processor, for managing said cache.

46. A system of generating printer-ready representations of pages having regions described by page assembly instructions, the system comprising:
- a first buffer storing the printer-ready representation of a previous page;
- a second buffer connected to said first buffer;
- a cache storing printer-ready region representations of cache regions; and
- a page assembly processor connected to said first buffer, said second buffer and said cache
  - for comparing the page assembly instructions of each region of a current page with the page assembly instructions of each equivalent region of said previous page and with the page assembly instructions of said cache regions,
  - for copying from said first buffer to said second buffer a portion of the printer-ready representation of said previous page, said portion corresponding to each region of said previous page that is similar to the equivalent region of said current page,
  - for each region of said current page that is not similar to the equivalent region of said previous page and is similar to a cache region, for copying the printer-ready region representation of said cache region from said cache to said second buffer, and for assembling into said second buffer each region of said current page that is not similar to any of said cache regions and is not similar to the equivalent region of said previous page.

47. A system according to claim 46, the system further comprising:

a cache manager connected to said first buffer, said second buffer, said cache and said page assembly processor, for managing said cache.

48. A system for generating printer-ready representations of pages having regions described by page assembly instructions, the printer-ready representations and page assembly instructions separable into multiple layers, the system comprising:

a buffer storing the printer-ready representation of a previous page; and a page assembly processor connected to said buffer for comparing for at least one selected layer the page assembly instructions of each region of a current page with the page assembly instructions of each equivalent region of said previous page, for assembling into said buffer for said at least one selected layer each region of said current page that is not similar to the equivalent region of said previous page, and for assembling into said buffer all regions of said current page for any unselected layers.

49. A system according to claim 48, wherein said multiple layers include a continuous tone (CT) layer and a line work (LW) layer, and wherein said at least one selected layer includes said CT layer.

50. A system according to claim 48, wherein page assembly instructions include references to page elements and an indication of locations of each of said page elements in an assembled page, the order of said references providing covering semantics, and said page assembly processor further comprises:

means for normalizing said page assembly instructions according to said locations while retaining said covering semantics; and means for lexically comparing said normalized page assembly instructions.

51. A system according to claim 50, wherein said means for normalizing comprises:

means for ranking each of said reference according to whether the page element it refers to covers at least part of at least one other of said page elements; and means for sorting said reference within each rank according to said locations.

52. A system according to claim 51, wherein said means for normalizing further comprises:

means for removing from said page assembly instructions references to page elements that are fully covered.

53. A system for generating printer-ready representations of pages having regions described by page assembly instructions, the printer-ready representations and page assembly instructions separable into multiple layers, the system comprising:

a first buffer storing the printer-ready representation of a previous page;

a second buffer connected to said first buffer; and a page assembly processor connected to said first buffer and said second buffer for comparing for at least one selected layer the page assembly instructions of each region of a current page with the page assembly instructions of each equivalent region of said previous page;

for copying from said first buffer to said second buffer a portion of said at least one selected layer of the printer-ready representation of said previous page, said portion corresponding to each region of said previous page that is similar to the equivalent region of said current page;

for assembling into said second buffer for said at least one selected layer each region of said current page that is not similar to the equivalent region of said previous page, and for assembling into said second buffer all regions of said current page for any unselected layers.

54. A system according to claim 53, wherein said multiple layers include a continuous tone (CT) layer and a line work (LW) layer, and wherein said at least one selected layer includes said CT layer.

55. A system for generating printer-ready representations of pages having regions described by page assembly instructions, the printer ready representations and page assembly instructions separable into multiple layers, the system comprising:

a plurality of buffers, each buffer storing the printer-ready representation of one of a corresponding plurality of previous pages; and a page assembly processor connected to said buffers for comparing for at least one selected layer the page assembly instructions of each region of a current page with the page assembly instructions of each equivalent region of a selected one of said previous pages, the printer-ready representation of said selected one of said previous pages stored in a corresponding selected one of said buffers, for assembling into said selected one of said buffers for said at least one selected layer each region of said current page that is not similar to the equivalent regioin of said selected one of said previous pages, and for assembling into said selected one of said buffers all regions of said current page for any unselected layers.

56. A system according to claim 55, wherein said multiple layers include a continuous tone (CT) layer and a line work (LW) layer, and wherein said at least one selected layer includes said CT layer.

57. A system for generating printer-ready representations of pages having regions described by page assembly instructions, the printer-ready representations and page assembly instructions separable into multiple layers, the system comprising:

a buffer storing the printer-ready representation of a previous page;

a cache storing at least one selected layer of printer-ready region representations of cache regions; and a page assembly processor connected to said buffer and said cache for comparing for said at least one selected layer the page assembly instructions of each region of a current page with the page assembly instructions of each equivalent region of said previous page and with the page assembly instructions of said cache regions, for each region of said current page that is not similar to the equivalent region of said previous page and is similar to a cache region, for copying said at least one selected layer of the printer-ready region representation of said cache region from said cache to said buffer, for assembling into said buffer for said at least one selected layer each region of said current page that is not similar to any of said cache regions and is not similar to the equivalent region of said previous page, and for assembling into said buffer all regions of said current page for any unselected layers.

58. A system according to claim 57, wherein said multiple layers include a continuous tone (CT) layer and a line work (LW) layer, and wherein said at least one selected layer includes said CT layer.

59. A system for generating printer-ready representations of pages having regions described by page assembly instructions, the printer-ready representations and page assembly instructions separable into multiple layers, the system comprising:

a first buffer storing the printer-ready representation of a previous page;

a second buffer connected to said first buffer;

a cache storing at least one selected layer of printer-ready region representations of cache regions; and a page assembly processor connected to said first buffer, said second buffer and said cache for comparing for said at least one selected layer the page assembly instructions of each region of a current page with the page assembly instructions of each equivalent region of said previous page and with the page assembly instructions of said cache regions;

for copying from said first buffer to said second buffer a portion of said at least one selected layer of the printer-ready representation of said previous page, said portion corresponding to each region of said previous page that is similar to the equivalent region of said current page, for each region of said current page that is not similar to the equivalent region of said previous page and is similar to a cache region, for copying said at least one selected layer of the printer-ready region representation of said cache region from said cache to said second buffer, for assembling into said second buffer for said at least one selected layer each region of said current page that is not similar to any of said cache regions and is not similar to the equivalent region of said previous page, and for assembling into said second buffer all regions of said current page for any unselected layers.

60. A system according to claim 59, wherein said multiple layers include a continuous tone (CT) layer and a line work (LW), and wherein said at least one selected layer includes said CT layer.

* * * * *

UNITED STATES PATENT AND TRADEMARK OFFICE
CERTIFICATE OF CORRECTION

PATENT NO. : 6,476,931 B1
DATED : November 5, 2002
INVENTOR(S) : Aizikowitz, Jacob et al.

It is certified that error appears in the above-identified patent and that said Letters Patent is hereby corrected as shown below:

<u>Title page,</u>
Insert Item [63], as follows:

-- Related U.S. Application Data

[63] This application claims the benefit of provisional application Serial No. 60/091,870 filed on July 6, 1998. --

Signed and Sealed this

Twenty-fourth Day of June, 2003

JAMES E. ROGAN
*Director of the United States Patent and Trademark Office*